(12) United States Patent
Kosolapov

(10) Patent No.: US 7,456,842 B2
(45) Date of Patent: Nov. 25, 2008

(54) COLOR EDGE BASED SYSTEM AND METHOD FOR DETERMINATION OF 3D SURFACE TOPOLOGY

(75) Inventor: Samuel Kosolapov, Carmiel (IL)

(73) Assignees: C.M.D. Controlled Micro Devices Ltd., Carmiel (IL); Cyber Vision (2004) Ltd., Tel Aviv (IL)

( * ) Notice: Subject to any disclaimer, the term of this patent is extended or adjusted under 35 U.S.C. 154(b) by 205 days.

(21) Appl. No.: 10/571,527

(22) PCT Filed: Sep. 9, 2004

(86) PCT No.: PCT/IL2004/000820

§ 371 (c)(1),
(2), (4) Date: Mar. 10, 2006

(87) PCT Pub. No.: WO2005/024720

PCT Pub. Date: Mar. 17, 2005

(65) Prior Publication Data

US 2007/0085849 A1    Apr. 19, 2007

(30) Foreign Application Priority Data

Sep. 11, 2003   (IL) ...................................... 157877

(51) Int. Cl.
*G09G 5/02*      (2006.01)
*G06T 15/00*     (2006.01)

(52) U.S. Cl. ........................ 345/589; 345/690; 345/694; 345/549; 345/77; 348/195; 348/496; 348/812; 358/505; 358/509; 382/162; 382/165; 382/274; 356/613; 356/629; 356/631

(58) Field of Classification Search ......... 345/418–420, 345/426, 428, 581, 589, 606, 611–613, 694–697, 345/690, 549, 652–654, 617–619, 204, 207, 345/38–100; 349/5–15, 132, 56–83, 97; 348/22–23, 41, 47–51, 42, 96–101, 496, 348/812

See application file for complete search history.

(56) References Cited

U.S. PATENT DOCUMENTS 5,818,959 A    10/1998   Webb et al.

(Continued)

FOREIGN PATENT DOCUMENTS

JP       2001-116656       4/2001

(Continued)

OTHER PUBLICATIONS

International Search Report dated Mar. 21, 2005, for International Application No. PCT/IL04/00820.

*Primary Examiner*—Wesner Sajous
(74) *Attorney, Agent, or Firm*—Lowe Hauptman Ham & Berner, LLP

(57) ABSTRACT

A method and system for determining surface topology of a three-dimensional (3D) structure, based on a structured pattern that is projected onto the surface structure, and images of the pattern superposed on the structured surface are analysed to provide surface coordinates of the structure. The pattern comprises a plurality of unique color edges defined between pairs of differently-colored stripes, which substantially overcomes ambiguity problems. In one embodiment, a calibration method is provided enabling the surface coordinates to be obtained from a single image of the structure.

21 Claims, 10 Drawing Sheets

U.S. PATENT DOCUMENTS

| | | | |
|---|---|---|---|
| 5,991,437 A | 11/1999 | Migdal et al. | |
| 6,028,672 A | 2/2000 | Geng | |
| 6,413,084 B1 | 7/2002 | Rubbert et al. | |
| 6,438,272 B1 | 8/2002 | Huang et al. | |
| 6,441,909 B1 | 8/2002 | Kobayashi | |
| 6,549,288 B1 | 4/2003 | Migdal et al. | |
| 2002/0024593 A1 | 2/2002 | Bouguet et al. | |
| 2003/0002052 A1* | 1/2003 | Hoffmann | 356/603 |
| 2003/0042401 A1 | 3/2003 | Gartner et al. | |
| 2003/0151720 A1 | 8/2003 | Chernyak et al. | |
| 2003/0169601 A1* | 9/2003 | Tachibana et al. | 362/554 |
| 2006/0087517 A1* | 4/2006 | Mojsilovic | 345/593 |
| 2006/0098212 A1* | 5/2006 | Forster et al. | 356/604 |

FOREIGN PATENT DOCUMENTS

| | | |
|---|---|---|
| WO | 2004/070315 A1 | 8/2004 |
| WO | 2006/034261 A2 | 3/2006 |

* cited by examiner

COLOR EDGE BASED SYSTEM AND METHOD FOR DETERMINATION OF 3D SURFACE TOPOLOGY

FIELD OF THE INVENTION

The present invention relates to the field of 3-dimensional (3D) scanning of a surface of a 3D object. More particularly, the present invention relates to a method for reliably, but yet in a simple manner, generating 3D coordinates of a surface of a 3D object, for example 3D coordinates of a surface of a human face.

BACKGROUND OF THE INVENTION

One possible way of obtaining 3D coordinates of an 3D object by from 2D digital image is carried out by utilizing, what is commonly known as the Original "Structured Light Technique", which is usually based on irradiating (i.e., projecting, e.g., white line(s), or strip(s), onto the surface of a 3D object, employing corresponding 2D image processing technique for distinguishing these lines/strips from other portions of the object (i.e., by usually utilizing simple threshold techniques), after which a known triangulation algorithm is utilized for calculating the 3D coordinates of points residing on these lines/strips. There is a well known ambiguity problem associated with the simultaneous projection of several lines onto the surface of the object, i.e., there is no reliable way to distinguish between different white lines of the 2D image in the presence of noise, because some points could be missed and other points could be falsely assigned to the wrong line. One possible approach to overcome these problems is to project only one line at a time, and, then, to process the resulting 2D image white points as corresponding to respective known lines. However, the problem with the aforesaid 'one white-line technique' is that only the coordinates of the points positioned on this line will be obtained. Conventional techniques try to solve this problem (i.e., getting a larger set of 3D points), by physically moving the line to various locations, or, alternatively, by using several lines, which are switched on and off. Both solutions are very long, inconvenient and time consuming processes and they require complicated hardware or mechanical tools.

Fitracks discloses in a co pending IL Patent application serial No. 154345 a method and apparatus for determining the 3-dimensional shape and dimensions of an object. However, Fitracks teaches utilizing a number of parallel light sources that are switched "ON" and "OFF" according to an acquisition algorithm. However, according to Fitracks, the number of the lines is limited to eight and, in any case, can not be significantly increased, thus restricting 3D resolution of Fitrack's scanner. In addition, Fitracks utilizes laser light, which is unacceptable in applications where the tested object is a human face.

In order to solve problems caused by use of white strips/ lines, a pattern that includes lines of different colors is used. Then, different lines are projected at the same time, and corresponding software distinguishes between the lines by their respective colors on the 2D image. However, the problem with the latter approach is that it can only be applied for white or homogeneously colored (say grey, yellow or green) colored objects, because when projected on a colored object, such as a human face, one or more of the colored lines could be similar to the colors in the object, which would render the color recognition technique unreliable.

U.S. Pat. No. 6,028,672 discloses high speed 3D imaging method, which is implemented, according to one embodiment, by two cameras, for creating stereo-pairs, and according to another embodiment, by one camera. However, using one camera as disclosed by U.S. Pat. No. 6,028,672, requires utilization of several mirrors and a LCD shutter, which makes the disclosed system expensive. In addition, the system of U.S. Pat. No. 6,028,672 requires very accurate spectral device, the price of which is normally in the range 730-1,395 US$, which is relatively high. Furthermore, the high accuracy spectral device is critical for obtaining the required results. However, a problem with this method is that, the spectrum of the light reflected from the object under test, is dictated according to the absorption spectrum of the reflecting surface, and, even worse, according to the reflection angle and texture of the reflecting surface.

U.S. Pat. No. 6,413,084 discloses a method and system for scanning an object, in which each one of the lines is assigned a bar-code like marker above it. However, this system can not be applied to human face, because most of the markers will not be reliably visible by the camera, or reliably resolved.

U.S. Pat. No. 6,438,272 discloses a method and apparatus for three dimensional surface contouring using a digital video projection system. According to U.S. Pat. No. 6,438,272, one camera is utilized, as well as color strips with separators. However, the aforesaid method/apparatus utilize a phase detection algorithm, which is incapable of handling missing sections in the lines. Therefore, a crucial factor, in operating the system of U.S. Pat. No. 6,438,272, is that the calibration pattern as a whole must be seen by the camera with no 'holes'/ missing sections. In addition, the method disclosed in U.S. Pat. No. 6,438,272 could be employed, as indicated therein, only on white or homogeneously colored surfaces, the angle of acquisition (i.e., of the face) must be very carefully chosen (to ensure contiguity of the pattern), and the optical elements of the camera must be of high precision. Therefore, this apparatus could be potentially exploited mostly by laboratories.

Other solutions are aimed at solving some of the above-described drawbacks. However, these solutions employ rather complex mathematical algorithms which are mostly highly unreliable in the real life environment, and/or use laser and/or digital projectors, which is a drawback by itself because of the cost.

All of the above-mentioned solutions have not provided a satisfactory solution to the problem of obtaining a 3D scanning of an object by means of very low cost, compactly designed, and reliable 3D scanning apparatus.

It is therefore an object of the present invention to provide a compact 3D scanning apparatus, which is inexpensive, easy to operate and reliable.

It is another object of the present invention to provide a 3D scanning apparatus that is capable of reliably handling non-uniformly colored shape of an object.

It is still another object of the present invention to provide a 3D scanning apparatus wherein the accuracy of the arrangement of its optical components, relative to one another, and the quality of the optical components are not critical to its proper functioning.

It is a further object of the present invention to provide a method for reliably obtaining a 3D model of a 3D object.

It is a further object of the present invention to provide a 3D scanning apparatus capable of operating rapidly or essentially in 'real-time'.

Other objects and advantages of the invention will become apparent as the description proceeds.

SUMMARY OF THE INVENTION

The present invention provides a simple novel method for generating a reliable 3D model of a colored surface of a 3D object.

The present invention is characterized in that the method, for generating a reliable 3D model of a colored surface of a 3D object, utilizes a unique colored pattern that is projected, in a first phase, onto a white 2D surface of a calibration object, for calibration purposes, and then, in a second phase, on the surface of the object whose 3D coordinates are to be obtained (or vice versa; i.e., the described order of phases could be reversed). In each one of the above-mentioned phases, a reflected image of the color pattern (in the first phase), or a reflected complex image, which comprises the color pattern superimposed on the surface of the object (in the second phase), is grabbed by an image grabbing apparatus. By 'grabbing' is meant the term used in the digital camera industry to describe a process of converting Charge-Coupled Device (CCD) signals into a sequence of digital bytes that are stored in the form of a corresponding file in any type of electronic memory.

In its utilization of a unique colored pattern, the present invention utilizes 'color jumps' rather than utilizing colored strips alone, as is done in some conventional techniques. By 'color jumps' is meant an abrupt color change between two parallel and adjacent strips each of which having a different color. The abrupt color change allows accurate and easy identification of the corresponding color edges, or color boundaries. By "color edge" is meant the boundary between two parallel and adjacent colored strips, each strip having a different color, and by 'unique color edge' is meant that every color edge (e.g., 'G/R'—'Green-Red' color edge) appears only once in the colored pattern. Color jump technique allow for reliably finding the location of each color edge. Each pair of adjacent colored strips could produce two unique color edges; that is, one order of appearance of the colored strips providing a first unique color edge, while another unique color edge is obtainable if the order of appearance of the colored strips is reversed. For example, according to the present invention, 'Green-Red' and 'Red-Green' color edges are considered as different unique color edges. Utilizing color edges is advantageous over utilization of color lines themselves, because the use of color edges drastically decreases the intrinsic ambiguity that characterizes the use of color lines. Utilizing unique color edges further enhances the calibration process, because, being unique, the relative spatial location of each calibration color edge, with respect to the other unique color edges, is precisely known, and, therefore, each point that is derived from a surface of an object, is easily and simply related to the correct calibration color edge.

The present invention is characterized also in that the colored strips, which form the unique colored pattern and are projected onto the surface of an object, form an angle α preferably other than zero with respect to contour or silhouette lines of the most conspicuous elements on the surface of the object. A well-chosen angle α ensures optimal identification of points that reside on these contour/silhouette lines. For example, in cases where the surface is the face of a person, the color strips would be declined in a way that, when projected on the face of the person, an angle α≅45° would be formed between the color strips and the silhouette lines of the nose and mouth.

Preferably, the method for generating a 3D model of a colored object, whose 2D image is grabbed by an image grabbing apparatus, comprises:

a) Providing a storage array for storing a group of {X,Y,Z} coordinates of a plurality of calibration points and a group of a plurality of {Row,Column} pairs that represent these calibration points in the image grabbing apparatus; and also for storing the {X,Y,Z} coordinates and the {Row,Column} pairs that relate to the same calibration points;

b) Performing a first step of calibration ('2D mapping'), which includes: (b.1) utilization of 2D calibration grid, for determining {X,Y,Z} coordinates of a plurality of calibration points residing on the 2D calibration grid when placed at a predetermined 'Calibration Stop', and finding, for each calibration point, a corresponding {Row,Column} pair that represents this calibration point in the image grabbing apparatus. The determined {X,Y,Z} coordinates and the corresponding {Row,Column} pairs, which represent the calibration points residing on the same (X-Y) plane, are stored in the storage array. By 'Calibration Stop' is meant the distance measured (i.e., along 'Z' axis) from an image grabbing apparatus to a predetermined (calibration) location, where the 2D calibration grid is positioned. In order to perform a calibration process, at least two different calibration stops (sometimes referred herein as 'First Calibration Stop' and 'Last Calibration Stop') are to be used; (b.2) repeating step (b.1), with the 2D calibration grid placed at another one or more different calibration stop (i.e., a calibration stop having a different 'Z' value), in order to obtain calibration data that represent calibration points that reside on two or more different and parallel planes. The calibration points, which relate to every calibration stop, define a work space, and the calibration data, which relates to calibration points in the work space, is herein referred to as the first calibration data set, which is stored in the storage array; (b.3) calculating, from the stored first calibration data set, a set of coefficients that represents the relationships for each calibrating stop between the {X,Y,Z} coordinates of each calibration point in the 2D calibration grid and the {Row,Column} pair that represents the calibration point in the image grabbing apparatus. The set of coefficients allows obtaining the {X,Y,Z} coordinates of essentially any point, given a {Row,Column} pair representation of this point, by manipulating (i.e., interpolating or extrapolating) data that corresponds to calibration points that are, preferably, the closest to this point;

The novel method is characterized by performing a second step of calibration that includes:

c) Placing a white planar surface at several calibration stops, as mentioned in step b), while at each calibration stop performing:

c.1) Projecting the color pattern on a white surface that is located at two or more predetermined calibration stops. The unique color pattern is formed by combination of a plurality of pairs of parallel and adjacent color strips, each color strip having a different color with respect to the adjacent strip, for allowing identification of respective unique color edges, by employing Directional Color Edge Detection algorithm. The color strips can be inclined by an angle α, with respect to contours and silhouettes lines on the surface of the object. The slide is intended to be projected on a white surface of a calibration object, for calibration purposes, and on the object whose 3D is to be obtained;

c.2) Projecting the unique color pattern on the white planar surface, and grabbing, by means of the image grabbing apparatus, and for each calibration stop, a 2D image that is the reflection of the color pattern from the white surface; and;

c.3) Identifying, in the grabbed 2D image, points that represent unique calibration color edges that are contained in the unique colored pattern. The identified points having corresponding {Row,Column} pairs that are stored in the storage array. Accordingly, each unique calibration color edge is, therefore, represented by two or more sets of {Row,Column} pairs; each one of the sets of {Row,Column} pairs, is obtained for each calibration stop, and all of the sets of {Row,Column} pairs being herein referred to as 'second calibration data set' and are stored in the storage array. Using the coefficients that were found in step b.3) to translate the sets of {Row, Column} pairs, which represent the unique color edges as viewed by the image grabbing apparatus in two or more calibration stops, to corresponding {X,Y,Z} coordinates; and d) Obtaining the 3D model of the surface of the object by:

d.1) placing the object in the work space and projecting the unique color pattern on the object. The three-dimensional (3D) object deforms the reflected color pattern in accordance with its 3D surface characteristics (e.g., curvature);

d.2) grabbing a 2D complex image that includes the deformed color pattern superimposed on the surface of the object;

d.3) identifying, in the complex image, {Row,Column} pairs of points that represent the unique color edges that are included in the deformed color pattern; and d.4) Utilizing the coefficients for translating the {Row, Column} pairs identified in step d.3) into corresponding {X,Y,Z} coordinates, for obtaining 3D model of the surface of the object, by using 'state-of-the-art' image processing means. A 3D representation of the surface of the object could be displayed on a 2D display means by using different presentation angles. Optionally, the 3D model could be utilized for performing geometrical measurements according to specific application needs. For example, the 3D model could be utilized for measuring the size of the eyes of a person, or for measuring the distance between the eyes.

According to one aspect of the present invention, the 2D calibration grid comprises a plurality of parallel vertical lines and parallel horizontal lines that form an X-Y plane. The vertical and horizontal lines could be (though this is not necessary) equidistantly spaced from one another. The intersection points of the horizontal lines and the vertical lines are the calibration points, and the first calibration data set is obtained by placing the 2D calibration grid at two or more calibration stops and utilizing these calibration points in the way described above. The 'vertical/horizontal lines' based calibration grid is primarily useful for manual calibration.

According to another aspect of the present invention the 2D calibration grid comprises a white surface of a 2D calibration object, on which a plurality of colored calibration markers are printed, painted, etched, adhered, or otherwise put, each colored calibration marker comprises a pair of bars, each bar having different color for providing a unique color edge. The method for utilizing these calibration markers comprises: (a) grabbing, by an image grabbing apparatus, the image of the colored calibration markers; (b) identifying, in the grabbed image, the unique color edges; and (c) identifying the central point in each unique color edge. The identified central points are the calibration points, and the first calibration data set is obtained by placing the 2D calibration object, with the calibration markers thereon, at two or more calibration stops, and utilizing the calibration points in the way described above.

The 'calibration markers' based calibration grid is better suited for an automated extraction of {Row,Column} pairs of calibration points, and, therefore, it is better suited for automated calibration process.

Preferably, the unique colored pattern further includes separators (herein after denoted by 'S'), each of which is part of the color pattern and placed between two unique color edges for allowing to easily distinguish between the various unique color edges). Optionally, two separators could be placed at the extreme ends of the color pattern (i.e., one separator at each extreme end).

Preferably, a separator 'S' is a combination of white and black strips (e.g., S=wbw, wherein 'w' and 'b' stand for 'white' and 'black', respectively). Optionally, one or more separators (including those placed at the extreme ends) could include any other combination(s) of colors, which combinations could include, or exclude, white and/or black colors. The word 'white' has two meanings: (1) when the unique colored pattern is projected (i.e., during the calibration process and when grabbing an image of an object whose 3D image is to be obtained) by utilizing a slide that contains the color pattern, the word 'white' refers to transparent strips in the slide; and (2) when the unique colored pattern is an image that is projected by a computer, the word 'white' means the color white.

According to the present invention, the method for obtaining the 3D coordinates of the surface of the 3D object further includes steps for imparting color attributes to the resulting representation of the modeled surface that essentially match the true colors of the surface of the object.

According to one embodiment of the present invention, the true color of the surface of the object is imparted to the 3D representation of the surface by performing the following steps:

a) Grabbing a true color 2D image of the surface of the object while the surface of the object is illuminated by white light; and b) For each point belonging to the 3D model, assigning a true color to the point by identifying its {Row, Column} pair and by identifying the true color of a point in the true color 2D image, whose {Row, Column} pair is essentially identical to the {Row, Column} pair of the point belonging to the 3D model. The identified true color (i.e., of the point in the true color 2D image) is assigned to the corresponding point belonging to the 3D model. This approach requires that the 3D Object will be stationary between two frames (i.e., one frame that is obtained by illuminating the object by color pattern, and the second frame by illuminating the object by white light).

According to another embodiment of the present invention, the true color of the face of the object is imparted to the 3D representation by utilizing the white strips, which are part of the separators in the color pattern, to get true color information of points that are positioned on these stripes and represent the true color of matching points on the surface of the object. More specifically, the white strips could be identified (i.e., by using any readily available color identification technique and by a priori knowledge of the relative location of the colored strips contained in the colored pattern), and, because the white strips are colorless, it is assumed that the space, which the white strips occupy in the corresponding grabbed 2D image, has the same color as the corresponding areas in the surface of the object. The color of points not illuminated by white strips (that is, points between white strips) may be calculated, if required, by utilizing any appropriate interpolation algorithm. This approach provides lower resolution (because of the use of interpolation) but enables real-time (for example, 30 frames per second) 3D Scanning of moving objects.

Preferably, the object is a human being, and the face of the object is, therefore, the face of the human being, or, optionally, any other part of interest (e.g., a palm or leg).

According to one aspect of the present invention, an angle α is utilized, which is chosen to optimize a 3D model of specific surface, or object.

Depending on the shape/curvature characteristics of the surface of the object, two or more angles α could be utilized for obtaining an optimal 3D model of the object. Each angle α allows establishing different, and independent, set of data, each set of data allows optimizing the 3D model with respect to corresponding contour/silhouette lines. That is, it is possible to establish one set of data by using α1 and another, independent, set of data by using α2, and then, combine the two independent sets of data to one optimized 3D model.

According to one aspect of the present invention, the resolution of the 3D model could be enhanced by utilizing a colored pattern that comprises more unique color edges, and/or more separators.

According to another aspect of the present invention, the resolution of the 3D Model could be enhanced by utilizing the color pattern in two or more different positions. According to this embodiment, the color pattern is moved in the same plane in a direction that is not parallel to the colored strips of the color pattern, until brought to some desired positioning, or the color pattern is rotated about some preferred axis that is normal to the plane of the color pattern, until brought to some desired position, or, the color pattern is both moved in the same plane, in a direction that is, or is not, parallel to the colored strips of the color pattern, and rotated about some preferred axis that is normal to the plane of the color pattern, until brought to a preferred position. Each different position contributes additional points, to the 3D Model whereby enhancing the resolution.

The present invention also provides a 3D scanning apparatus, comprising:
a) A housing, comprising:
   a.1) A slide, containing a unique color edge pattern. The unique color edge pattern being formed by a combination of a plurality of pairs of parallel colored strips, each color strip having a different color with respect to the adjacent strip, for allowing convenient and accurate identification of respective unique color edges. The colored strips could be inclined by an angle α, with respect to contours and silhouettes on the surface of the object whose 3D model is to be obtained. The slide is intended to be projected on a white surface of a calibration object, for calibration purposes, and on the surface of an object whose 3D is to be obtained;
   a.2) Slide projector lamp, for illuminating the slide containing the unique color edge pattern;
   a.3) Slide projector condenser lens (optional), for providing parallel light to one side of the slide;
   a.4) Slide projector lens, for focusing the projected color edge pattern on the surface;
   a.5) Mirror (optional), for deflecting the projected color edge pattern to the direction of the surface; and
   a.6) Digital image grabbing apparatus, for grabbing a 2D image of calibration patterns and for grabbing an image of the reflection of the color edge pattern from the surface of the object.
b) Calibration object, for obtaining a plurality of sets of calibration points, which form a first and second calibration data sets and defining a work space. The calibration object is external to the housing and placed at various calibration stops with respect to the housing, for allowing obtaining the calibration, points;
c) Spot lamp (optional), for illuminating the calibration object, while the calibration process is carried out, and the surface of the object, in order to get true color 2D image for extracting true color information; and Computer system, for: d.1) Receiving, from the digital image grabbing apparatus, 2D digital images of a calibration grid, or calibration marks with, optional control marks at different calibration stops. At each calibration stop, a set of 3D calibration points is obtained the {X,Y,Z} coordinates of which are known; d.2) Relating the known {X,Y,Z} coordinates of each calibration point, in each set, to a corresponding {Row,Column} pair in the corresponding 2D digital image; d.3) Storing all of the relationships obtained in step d.2) as first calibration data set; d.4) Performing steps d.1) and d.2), but with the calibration grid/marks being replaced by a color pattern, for obtaining relationships between {X,Y,Z} coordinates of points residing on each unique color edge that is included in the unique colored pattern; d.5) Storing all of the relationships obtained in step d.4) as second calibration data set, and calculating there from a set of coefficients that represents the relationships for each calibration stop between the {X,Y,Z} coordinates of each calibration point in the 2D calibration grid/marker and the {Row,Column} pair that represents the calibration point in the image grabbing apparatus; d.6) Operating the slide, slide projector and, optionally, spot light, for projecting the color edge pattern on the surface of the object; d.7) Receiving, from the digital image grabbing apparatus, 2D digital image(s) of the color edge pattern, as reflected by the surface of the object; d.8) Identifying therein a set of points, the {Row,Column} pairs of which are known but the {X,Y,Z} coordinates of which are to be found, or calculated by interpolation/extrapolation; d.9) Relating the known {Row,Column} pairs of the points to corresponding {X,Y,Z} coordinates, by utilizing said set of coefficients; and d.10) imparting true color to said 3D model, by: (a) receiving a true color 2D image of the object while the object is illuminated by white light; and (b) assigning, for each point belonging to the 3D model, a true color to said point by identifying its {Row, Column} pair and by identifying the true color of a point in the true color 2D image, whose {Row, Column} pair is essentially identical to the {Row,Column} pair of the point belonging to the 3D model, the identified true color is assigned to the corresponding point belonging to the 3D model.

According to an aspect of the present invention, the digital image grabbing apparatus and the projector reside within different housings.

Herein, "strip" and "stripe" are generally used interchangeably to refer to a two dimensional colored area, having a length dimension much greater than a width dimension.

Thus the present invention relates to a structured light pattern for use in the determination of 3D surface topology of a 3D structure, wherein said pattern may be projected onto such a structure and 3D surface topology thereof is determined from at least one image obtained of the structure with said pattern reflected therefrom, the pattern comprising a plurality of pairs of colored stripes, wherein each said pair comprises:

two juxtaposed discrete stripes, one said stripe being of a different color from the other stripe; and a unique color edge defining a unique color transition boundary between the colors of said two adjacent stripes in a predetermined direction substantially orthogonal to a longitudinal direction of said stripes;

wherein each said color edge is sufficiently unique at least one of:

by itself; and in its spatial relationship with color edges of other said pairs of stripes in a common neighborhood in said pattern comprising said pairs;

such as to enable identification of each color edge of said pattern when said pattern is reflected from said 3D structure.

Herein, "discrete stripe" refers to the width dimension of each stripe being sufficient to enable optical identification of the stripe, typically the width dimension being at least 2 pixels wide, and often 3 pixels. (**as agreed with inventor)

Preferably:— the unique color edge of each said pair is not repeated at least in adjacent said pairs thereto; and/or the colors of said stripes in each pair are chosen to emphasize color contrast between one stripe and the other stripe of said pair; and/or each stripe comprises a color that is substantially uniform within the stripe; and/or the pattern is based on said stripes being any one of three basic colors; and/or the stripes are colored exclusively in primary colors chosen from the group: red, blue and green; and/or the stripes are colored exclusively in colors chosen from the group: red, blue, green, magenta, cyan and yellow.

Optionally, the pattern further comprises at least one spacer stripe between each adjacent said pair of stripes, said at least one spacer stripe being of a color having a predetermined color contrast with a said stripe of each one of said adjacent pairs of stripes that is adjacent to said at least one spacer stripe. The spacer stripes may comprise a white stripe between adjacent pairs of stripes; or a black stripe between adjacent pairs of stripes; or a group of stripes, comprising a black stripe sandwiched between two white stripes, between adjacent pairs of stripes.

Optionally, the pattern further comprises a trailer comprising at least one stripe adjacent to at least one or another of a first and a last said pairs taken along said direction. The trailer stripes may comprise a group, comprising a sequence of two black stripes, a white stripe, a black stripe, a white stripe and a black stripe adjacent to said first pair of stripes. Another one of the trailer stripes may comprise a group, comprising a sequence of a black stripe, a white stripe, a black stripe, a white stripe and a black stripe adjacent to said last pair of stripes.

In one embodiment, the pattern may comprise the following color stripe sequence:

bbwbwb wbwRGwbwBG wbwRBwbwGB wbwBRwb-wGRwbw bwbwb wherein:

b=black stripe
w=white stripe
R=red stripe
B=blue stripe
G=green stripe

In another embodiment the pattern comprises the following color stripe sequence:

wbwRGwbwRBwbwRMwbwRCwbwRY
wbwGRwbwGBwbwGMwbwGCwbwGY
wbwBRwbwBGwbwBMwbwBCwbwBY
wbwMRwbwMGwbwMBwbwMCwbwMY
wbwCRwbwCGwbwCBwbwCMwbwCY
wbwYRwbwYGwbwYBwbwYMwbwYCwbw wherein:

b=black stripe
w=white stripe
R=red stripe
B=blue stripe
G=green stripe
M=Magenta
C=Cyan
Y=Yellow.

The structured pattern of the invention is extremely effective in overcoming the correspondence problem and allows each part of pattern to be positively identified when the pattern is projected onto a three-dimensional (3D) structure. Accordingly, the pattern may be used with any 3D structure determination method or system which utilizes a structured pattern that is projected onto the structure and from which one or more images are taken and analysed.

The present invention is also directed to a method for determining 3D surface topology of a 3D structure, comprising:—

(a) illuminating said structure with the structured pattern defined of the present invention;

(b) capturing at least two images of the structure on which the said structured pattern is being shone;

(c) identifying corresponding unique color edges between said images;

(d) applying a suitable mathematical technique for determining surface coordinates of said structure from the correspondence found in step (c).

Optionally, in step (d), said mathematical technique includes a triangulation method, or alternatively an epipolar method.

The present invention also relates to a method for determining surface topology of a 3D structure, comprising:—

(a providing a calibration image of a structured pattern reflected from a calibration object at each one of at least two calibration stops serially spaced along an optical axis at predetermined depths from a source projecting said structured pattern according to the present invention;

(b) for each said calibration image, identifying unique color edges between stripes of each said pair of stripes and determining spatial coordinates associated with said unique color edges;

(c) aligning said structure along said optical axis, projecting said structured light pattern onto a surface of said structure wherein said pattern is modified by virtue of the topology of the structure surface such that to provide a modified pattern superposed over said structure surface comprising a plurality of modified color edges corresponding to said color edges;

(d) providing at least one complex image of said structure surface with said modified pattern superposed thereon, and for each said complex image identifying unique modified color edges between stripes of each said pair of stripes with respect to said color edges of said pattern; and (e) for each said unique modified color edge, determining spatial coordinates associated therewith from the spatial coordinates obtained in (b) for the corresponding unique color edge of each said calibration image, to provide surface coordinates of said structure.

Typically, the structure surface has depth values from said source between a first depth and a second depth, and wherein one said calibration stop is at a depth from said source not greater than said first depth and another said calibration stop is at a depth from said source not less than said second depth, wherein said first depth is less than said second depth.

In one embodiment, steps (a) and (b) comprise the sub steps:

(i) providing a storage array for storing a group of {X,Y,Z} coordinates of a plurality of calibration points and a group of a plurality of {Row,Column} pairs that represent said calibration points in said image grabbing apparatus; and also for storing the {X,Y,Z} coordinates and the {Row,Column} pairs that relate to the same calibration points;

(ii) performing a first step of calibration, including:

(b.1) utilization of 2D calibration grid, for determining {X,Y,Z} coordinates of a plurality of calibration points residing on the 2D calibration grid when placed at a predetermined calibration stop, and finding for each calibration point a corresponding {Row,Column} pair that represents said calibration point in said image grabbing apparatus, the determined {X,Y,Z} coordinates and the corresponding {Row,Column} pairs, which represent the calibration points that reside on the same (X-Y) plane, being stored in said storage array;

(b.2) repeating step (b.1), with the 2D calibration grid placed at another one or more different calibration stops, in order to obtain calibration data that represent calibration points that reside on two or more different and parallel planes, said calibration points, which relate to every calibration stop, defining a work space and the calibration data relating to calibration points in said work space being a first calibration data set that is stored in said storage array;

(b.3) calculating, from the stored first calibration data set, a set of coefficients that represents the relationships, for each calibrating stop, between its {X,Y,Z} coordinates in the 2D calibration grid and the {Row,Column} pair that represents said calibration point in said image grabbing apparatus, said set of coefficients allowing obtaining the {X,Y,Z} coordinates of essentially any point, given a {Row,Column} pair representation of said point, by manipulating data that corresponds to calibration points that are, preferably, the closest to said point;

(iii) placing a white planar surface at several calibration stops, as described in step (ii), while at each calibration stop performing:

c.1) projecting a unique color pattern on said white planar surface that is located at two or more predetermined calibration stops;

c.2) grabbing, by said image grabbing apparatus and for each calibration stop, a 2D image that is the reflection of the unique color pattern from said white planar surface;

c.3) identifying, in the grabbed 2D image and for each calibration stop, points that represent unique calibration color edges that are contained in said unique color pattern, the identified points having corresponding {Row,Column} pairs that are stored in the storage array, each unique calibration color edge being represented by two or more sets of {Row,Column} pairs, each one of said sets of {Row,Column} pairs being obtained for each calibration stop, and all of the sets of {Row,Column} pairs being a second calibration data set that is stored in said storage array; and c.4) using the coefficients found in step b.3) to translate the sets of {Row,Column} pairs to corresponding {X,Y,Z} coordinates.

In one embodiment, wherein steps (c) to (e) comprise:

d.1) placing said object in said work space and projecting the unique color pattern on said object;

d.2) grabbing a 2D complex image that includes said color pattern, as deformed by said surface of the object, that is superimposed on said surface of said object;

d.3) identifying, in said complex image, {Row,Column} pairs of points that represent the unique color edges that are included in the deformed color pattern; and d.4) utilizing said coefficients for translating the {Row,Column} pairs identified in step d.3) into corresponding {X,Y,Z} coordinates, for obtaining 3D model of said surface of the object.

Thus, the present invention also relates to a system for the determination of 3D surface topology of a 3D structure, comprising:

illumination means adapted for projecting a beam of structured light onto at least said portion, said structured light having a pattern according to the present invention;

at least one image capture means for capturing at least one image of said portion with said structured pattern projected thereon;

processing means adapted for determining surface topology of at least said portion based on said at least one image provided by said at least one image capture means.

The illumination means typically comprises a light source, focusing optics and a slide comprising said structured pattern, and the illumination means is comprised in a housing, which can further comprise the image capture means. The image capture means typically comprises a digital image grabbing apparatus.

The system typically further comprises a calibration apparatus, comprising a calibration object movable between at least a first calibration station and a second calibration station defining a workspace therebetween in which the said portion of said structure is to be positioned, wherein said processing means is adapted for determining depth values associated with said portion based on depth values of said calibration object at said at least first and second calibration stations. The calibration object comprises a two-dimensional calibration grid including a plurality of parallel vertical lines and parallel horizontal lines that form an X-Y plane, the intersection points of said horizontal lines and said vertical lines are the calibration points. Alternatively, the calibration object comprises a white surface on which a plurality of colored calibration markers are printed, painted, etched or adhered, each colored calibration marker comprising a pair of bars, each bar having different color for providing a unique color edge.

The present invention also relates to a method for determining surface topology of a 3D structure, comprising:—

(a) providing a calibration image of a structured pattern, comprising a plurality of geometrical portions, reflected from a calibration object at each one of at least two calibration stops serially spaced along an optical axis at predetermined depths from a source projecting said structured pattern;

(b) for each said calibration image, identifying unique portions of said structured pattern corresponding to predetermined portions of said structured pattern in another said image, and determining spatial coordinates associated with said unique portions;

(c) aligning said structure along said optical axis, projecting said structured light pattern onto a surface of said structure wherein said pattern is modified by virtue of the topology of the structure surface such that to provide a modified pattern superposed over said structure surface comprising a plurality of modified geometrical portions corresponding to said geometrical portions;

(d) providing at least one complex image of said structure surface with said modified pattern superposed thereon, and for each said complex image identifying unique modified geometrical portions corresponding to said geometrical portions; and (e) for each said unique modified portion, determining spatial coordinates associated therewith from the spatial coordinates obtained in (b) for the corresponding unique portion of each said calibration image, to provide surface coordinates of said structure.

The present invention also relates to a computer readable medium storing instructions for programming a microprocessor means of a system according to the invention to perform a method according to the invention. A computer readable medium storing instructions for programming a microprocessor means of a system as defined in any one of claims 25 to 24 perform a method as defined in any one of claims 17 to 24.

BRIEF DESCRIPTION OF THE DRAWINGS

In order to understand the invention and to see how it may be carried out in practice, one or more embodiments will now be described, by way of non-limiting example only, with reference to the accompanying drawings, in which:

FIG. 7b shows a grabbed image of the plaster face illuminated by color pattern, as vaguely shown in FIG. 7a;

DETAILED DESCRIPTION OF PREFERRED EMBODIMENTS

Figure 1:
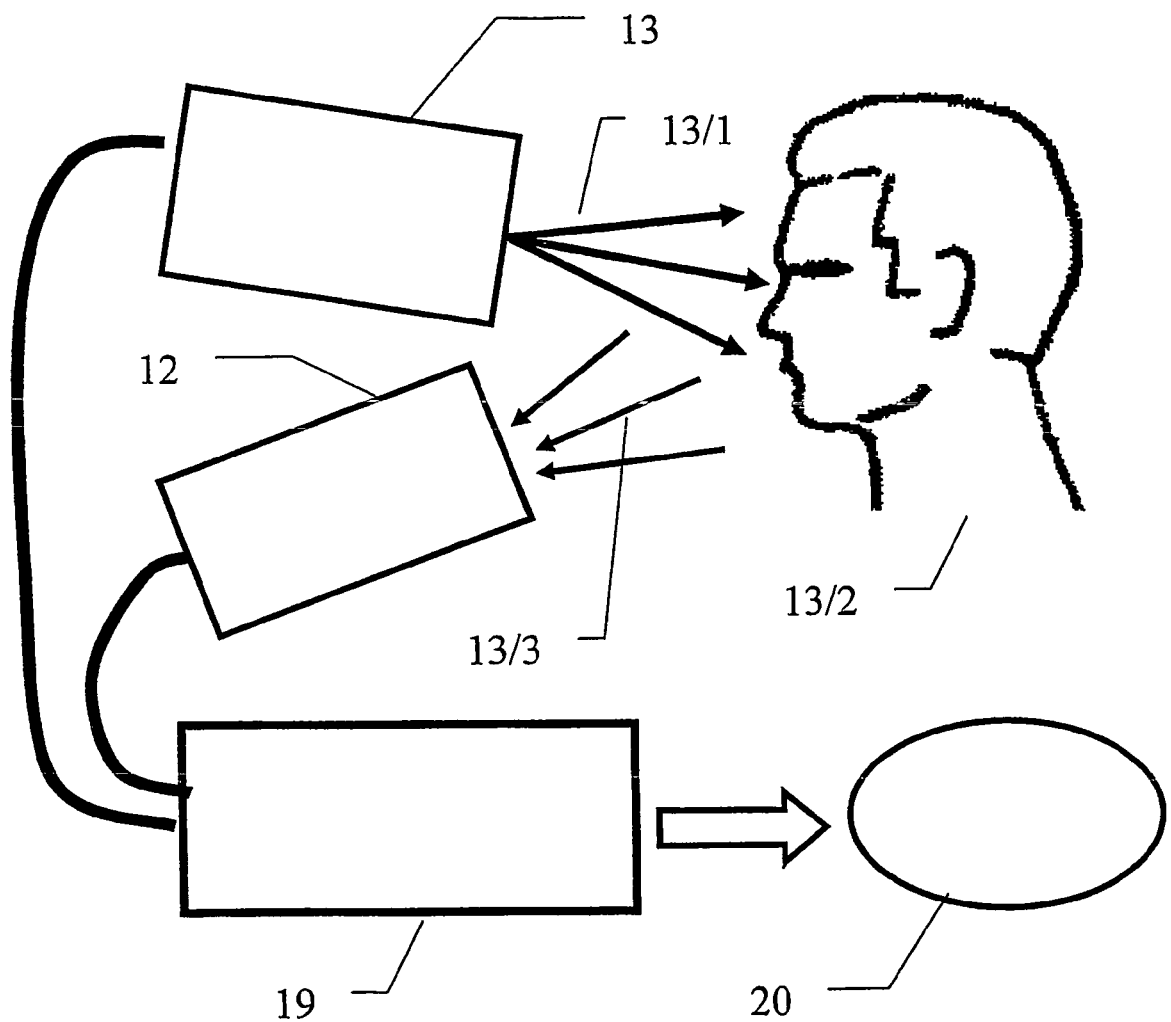
FIG. 1 schematically illustrates a general layout and functionality of an system for obtaining a 3D model of a surface of an object.

FIG. 1 schematically illustrates a general layout and functionality of the present invention. Slide projector 13 irradiates a color edge pattern (the radiation being schematically indicated as 13/1) onto a face 13/2 of a person. A portion 13/3 of the irradiated color light 13/1 is reflected from face 13/2, and received by an image grabbing apparatus 12, which could be; e.g., a digital video, or still, camera. The grabbed image is forwarded to computer 19, which includes corresponding software for processing the acquired image, for obtaining a 3D True Color Model 20, or 3D representation, of the human face 13/2. The 3D True Color Model of the human face relates to points that were derived from a set of points positioned on the surface of the human face, each point being characterized by its {X,Y,Z} coordinates and by its true color attributes.

This 3D Model can be used by the software to generate 2D projections, or images, of the human face from different angles and positions.

Figure 2:
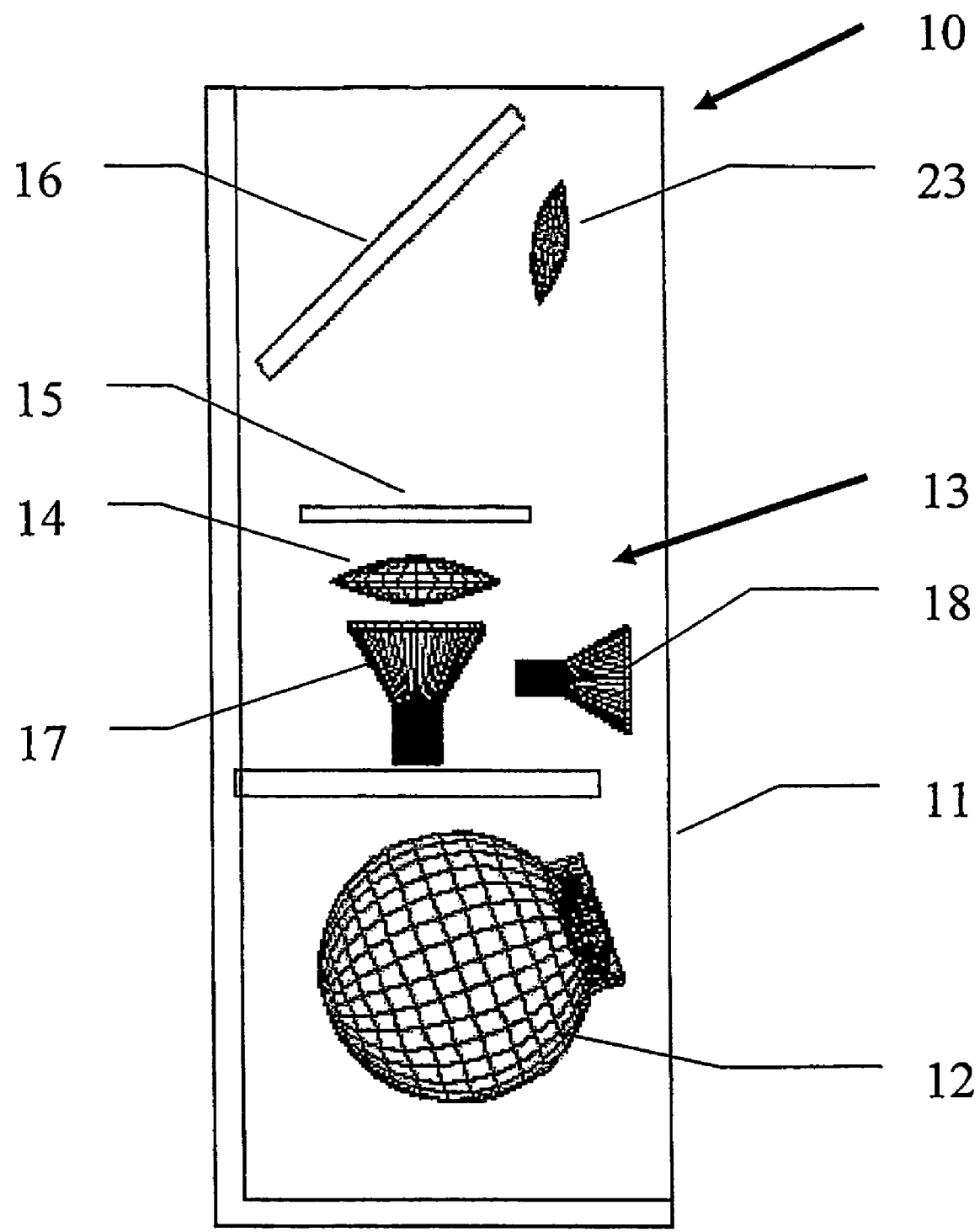
FIG. 2 schematically illustrates the main components of a "3D Scanner", according to an exemplary embodiment of the present invention.

FIG. 2 schematically illustrates in general the main components of the "3D Scanner", according to one embodiment of the present invention.

The system of the invention may be in the form of a 3D Scanner 10 consists of Housing 11, which comprises:

(1) Digital image grabbing apparatus 12, which could be a still, or optionally video, camera, is functionally connected to a controlling means (not shown), such as the computer 19 shown in FIG. 1, with corresponding software. Still/Video camera 12 could be any readily available camera (i.e., "From the shelf"); and (2) Slide Projector 13, the operation of which is controlled by the controlling means (not shown), which Slide Projector comprises:
Slide Projector' Lamp 17;
Slide Projector' Condenser Lens 14;
Slide 15;
Mirror 16; and
Slide Projector' Lens 23.

The Slide Projector could be any commercially available Slide Projector or a dedicated Slide Projector (i.e., one that is specially designed for complying with the objectives of the present invention).

3D Scanner 10 may further comprise an additional White Light Source 18 (i.e., Spot Lamp), the operation of which could be controlled by; e.g., computer 19 (in FIG. 1).

The controlling means (not shown) could be either a readily available computer, such as computer 19, or a dedicated controller (i.e., that is specially designed for cooperating with the 3D Scanner).

The arrangement of the components inside housing 11, as shown in FIG. 2, is only one possible way for implementing 3D Scanner 10. However, this arrangement was found to be rather optimal for obtaining 3D images of a human face in the home environment.

Description of the 3D Scanner Elements

1. Housing 11. The entire 3D Scanner is assembled inside the non-opaque non-reflective housing constructed, for example, with black non-reflective plastic inside and from non-reflective plastic of any color outside. Exemplary external dimensions of housing 11 are 100 mm (W)×100 mm (D)×250 mm (H). Of course, other dimensions of housing 11, as well as other arrangements of the components residing therein, could be utilized as well, without departing from the scope of the present invention, Housing 11 has openings in its front side (i.e., the side facing the object that is to be scanned) for the: (1) Lens of camera 12; (2) Lens 23 of Slide Projector 13; (3) Spot Lamp 18; and for an (4) electrical cable that functionally connects the relevant components residing within scanner 10 to the (external) computer/controller (not shown).

In a typical situation, 3D Scanner 10 is positioned on a table in close proximity to the computer/controller and approximately 30-50 cm away from the face of a person, whose face is to be grabbed by means of camera 12 and analyzed (i.e., modeled) by the computer/controller. The person sits near the table so that he may see the image of his face on the computer's monitor, for allowing him to operate the mouse during acquisition of the image of his face by camera 12, and to know if he is looking directly towards the 3D camera 12 or in another direction, at different stages of the acquisition process. Optionally, an interface may be provided, which, during the acquisition process, instructs the user (e.g., by audio commands) to "Look into the camera", "Look to the Right", etc., for obtaining the plurality of 3D models of his face, which could be later combined into one 3D Model. For example, a 3D model of the left side of a human face could be obtained, while the right side is not visible. Then, a second model of the right side of this face might be obtained, after which, the left and right 3D models could be combined into one 3D model using state-of-the-art image processing means.

Optionally, several 3D scanners, such as scanner 10, could be spatially positioned and used, for obtaining a full panoramic model of the human face, or any other 3D object. Each of the scanners obtaining part of the 3D Model of the object, with state-of-the-art image processing software used to combine all partial 3D models into one full (panoramic) 3D Model of the object, essentially in a way described in the Fitracks patent application referenced above.

2. Camera 12, one task of which is grabbing true color images of the object. Due to the calibration process, which includes utilization of a unique colored pattern, the lens of camera 12 can be of poor quality, producing relatively large distortions, without compromising 3D imaging accuracy. The parameters (e.g., Brightness, Contrast, etc.) of camera 12 must be controlled by a corresponding computer/controller, to allow adequate acquisition of images under different conditions of lighting. For example, a human face could be illuminated in a room by natural light or 'spot' light. A spot light might be utilized in cases where natural light in the room is inadequate. Another exemplary light condition is whenever a human face is illuminated by a Slide Projector for obtaining Structured Light Image, in a way described herein below.

The resolution of the camera defines the 3D accuracy (see calculations herein below). According to an exemplary embodiment, an SVGA camera with resolution of (640×480 pixels) was utilized with true color 24 bit per pixel (8 bit for each one of the basic {R,G,B} colors ("R"=red, "G"=green and "B"=blue colors).

3. Slide Projector 13, the task of which is projecting specially designed Structured Light Pattern (i.e., Color Edge Pattern—the pattern and functionality of which are described herein) onto a surface of an object, the 3D model of which is to be obtained. Due to the uniqueness of the calibration process, which is described below, the Slide Projector's optical and mechanical characteristics can be poor and considerable optical distortions allowed without compromising the resulting 3D accuracy. An exemplary Slide Projector, which was utilized for demonstrating the benefits of the principles disclosed in the present invention, consists of:

3.1) Lamp 17, which is strong enough to provide enough light for the digital camera to grab relevant images, but weak enough not to blind a person being scanned. Standard spot lamp (for example 12V, 50W) is adequate for the goals of this invention;

3.2) Slide Projector Condenser Lens 14 (optional), the function of which is providing uniform illumination on the Slide;

3.3) Slide 15 (to be described later)

3.4) Mirror 16 (optional), the task of which is to deflect a projected pattern to a desired direction, such as towards the face of a person; and 3.5) Slide Projector Lens 23, the task of which is to focus the projected pattern onto the face of a person that is positioned, say, approximately 30-50 cm from Slide Projector Lens 23.

The arrangement of the slide projector, as schematically shown in FIG. 1 and FIG. 2, was chosen in order to provide a compact design for the 3D Scanner However, other arrangements, for projecting the same pattern(s) on the surface of the object (including objects different from a human face), might be utilized as well.

4. Additional (Optional) white lightning means (i.e., Spot Lamp 18), which is controlled by a computer (not shown), could be utilized. Spot Lamp 18 could be chosen (or especially designed) to project white light onto a calibration object and onto the surface of the object being scanned or onto the face of a person.

5. A readily available ('off-the-shelf') Computer, or any controller that is suited or specially designed, for: (a) controlling slide projector lamp 17, spot lamp 18 and camera 12, according to a prescribed acquisition and calibration protocol; (b) grabbing data of images picked up by camera 12; (c) processing calibration data; (d) generation of the corresponding 3D Image from stored image(s) and calibration data; and (d) presenting the corresponding 3D image according to user's chosen interface.

Slide (and Projected Pattern) Description

Figure 3A:
FIGS. 3a and 3b show two exemplary unique colored pattern (shown as corresponding grey levels), according to an embodiment of the present invention.
Figure 3B:
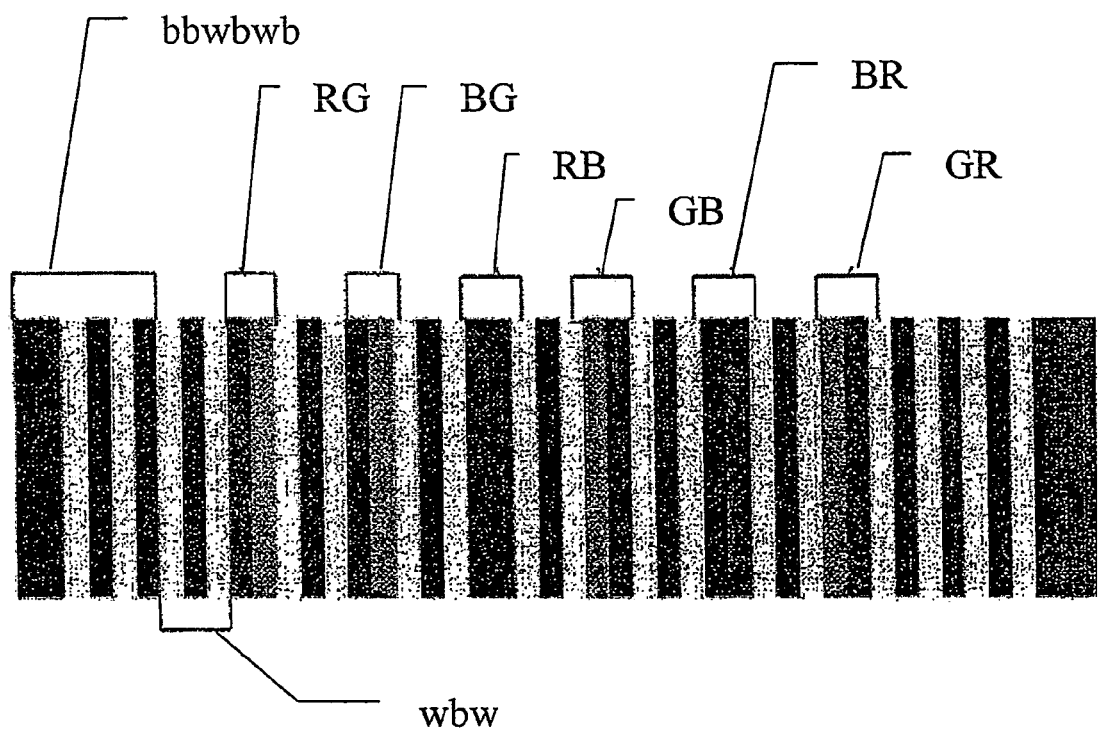

Referring to FIGS. 3a and 3b and as described before, utilizing white lines for obtaining a 3D presentation of a surface of an object involves very inconvenient and time consuming processes. The present invention utilizes a specially designed set of color strips that are organized in such a way that a large number of lines can be simultaneously processed, resulting in more accurate and faster 3D image acquisition process. In addition, the production of the pattern of colored strips is simple and inexpensive, because all that is required for its production are readily available inexpensive transparent film, a computer, capable of handling simple graphics, and a state of the art ink-jet printer, for printing the required pattern on the transparent film. Other ways to produce such a slide are any appropriate printing process, like photo printing Color Edge Technique (CET)

Color Edge Technique is based on searching for Color Differences ("Jump of the Color") in the vicinity of the Color Edge. The CET technique provides more reliable line position recognition in cases where the color of the object is not changed abruptly in the vicinity of the color edge, as is the case of, e.g., Human Face.

Directional Color Edge Detection (DCED)

Directional Color Edge Detection is the natural extension of edge detection techniques that are well known in the field of image processing. The goal of DCED is to evaluate the exact position of a known color jump in the overall image at a specified, given, or wanted direction. There is a large number of "Edge Detectors" that can be utilized. A rather simple Color Edge Detector algorithm is utilized by this invention. However, any other appropriate algorithm may be used as well.

In order to facilitate the understanding of how an edge line is identified in an image, the following example will now be described:

Suppose that there is a digital data stored in the memory of a computer, which represents an image, and that one line of this image is to be 'scanned' (i.e., in an attempt to identify color changes, or edge points, along that line). Suppose, further, that a test is to be made, to determine whether at the column position [i] (i.e., column of index [i]) there is a vertical color edge 'GREEN-RED' (i.e., [GR]) in the Left-to-Right direction along the scanned line). Suppose, further, that the digital data that corresponds to the scanned line is as specified in Table-1:

TABLE 1

| Column number | i−4 | i−3 | i−2 | i−1 | i | i+1 | i+2 | i+3 | i+4 |
|---|---|---|---|---|---|---|---|---|---|
| RGB Value | V[i−4] | V[i−3] | V[i−2] | V[i−1] | V[i] | V[i+1] | V[i+2] | V[i+3] | V[i+4] |

In Table-1, V[i] is a structure of type RGB (i.e., Red, Green and Blue) and V[i].R denotes the red value, or component/portion, of a pixel in location [i].

Although the width of the stripes can be 2 pixels each, suppose that it is known for a certain case that the width of the strips is not narrower that three pixels, and specifically to the current discussion. 'R' strip and the 'B' strip is not narrower then three pixels. Then, one exemplary algorithm for demonstrating the concept comprises the steps of:

1) Calculating Left.R, Left.G, Left.B:

LeftR=V[i−3].R+V[i−2].R+V[i−1].R

LeftG=V[i−3].G+V[i−2].G+V[i−1].G

LeftB=V[i−3].B+V[i−2].B+V[i−1].B

2) Calculating Right.R, Right.G, Right.B:

RightR=V[i+2].R+V[i+1].R+V[i].R

RightG=V[i+2].G+V[i+1].G+V[i].G

RightB=V[i+2].B+V[i+1].B+V[i].B

3) Calculating Color Jump:

ColorJump.R=Right.R−Left.R

ColorJump.G=Right.G−Left.G

ColorJump.B=Right.B−Left.B

4) Deciding whether there is Color Edge 'GR' at the point [i]:

IF { ( ColorJump.R > LimitR )
  AND ( −(ColorJump.G > LimitG))
    AND( abs( ColorJump.B) < LimitB ) } then "This is GR color edge"
      otherwise "This is NOT GR color edge"

where LimitR, LimitG, LimitB are empirical parameters chosen according to application.

The criteria described in step 4) (immediately above) must be adapted according to the Left and Right colors of the Color Edge that is being searched for, that, is for each unique color jump a proper criteria must be provided.

If for some practical reason (for example because of noise), several points of the color edge are not be recognized by DCED (false negative), the only result of this will be that these missed points will not be part of the resulting 3D Model. This will not severely deteriorate the 3D model provided that the number of these points is not large. On the other hand, situations in which some "non-edge" points are erroneously recognized as "edge points" are negligible. Therefore, even the simplest DCED is robust and reliable enough for the goals of this invention. Nevertheless, more robust color-edge techniques could be utilized for minimizing the number of 'missed-points' and erroneous points.

A number of other, more robust techniques which are insensitive to the background light intensity and noise, and to properties of the detectors, can be developed and utilized for specific applications.

Pattern

There are a large number of possible color patterns, which can be utilized for generating 3D image of an object, provided that the colors are different for each adjacent edge (including order of the adjacent colors, see later explanation). In addition, in order to improve the 3D resolution, color spacers/separators can be included in a color pattern.

For the sake of simplicity, an example of a color pattern having six basic colors is described below, which can be reliably produced on the slide's surface and the colors of which can be reliably distinguished by a true color camera. The six colors are 'Red' (R), Green (G), Blue (B), Magenta (M), Cyan (C) and Yellow (Y). The pattern includes additional colors; i.e., White (w) and Black (b) (in small letters, to distinguish black from Blue). The latter colors (i.e., w and b) will be used as separators. Of course, any other selection of colors could be utilized with the camera still being capable of distinguishing between the different colored strips.

In addition, "S" will symbolize a separator/spacer, which may consist of a short sequence of the colors mentioned above (i.e., R, G, B, M, C, Y, w and b). Edges at the separator are not unique, but they are located between unique edges, so they also could be reliably distinguished.

It should be noted that employing the Color Edge Technique on the color pair 'XY' and on the color pair 'YX' (wherein 'X' and 'Y' are two different colors) would yield different unique color edges. This way, each pair of colors would provide two unique color edges. The more unique color edges there are the better is the resolution of the 3D Model.

FIG. 3a shows (in gray levels) an exemplary unique colored pattern of relatively complex pattern of colored strips. This exemplary pattern was obtained by using all possible combinations of six colors (i.e., each combination providing a unique color edge), and by 'implanting' separators ('wbw') to allow distinguishing between each two adjacent color edges. The sequence (described below) representing the unique color pattern is to be read from the left hand side to the right hand side, and from the upper line to the bottom line:

wbwRGwbwRBwbwRMwbwRCwbwRY
wbwGRwbwGBwbwGMwbwGCwbwGY
wbwBRwbwBGwbwBMwbwBCwbwBY
wbwMRwbwMGwbwMBwbwMCwbwMY
wbwCRwbwCGwbwCBwbwCMwbwCY
wbwYRwbwYGwbwYBwbwYMwbwYCwbw This sequence provides 153 color edges, which gives spacing of four pixels (i.e., 640/153) between each two color edges. This pixel width is more than adequate for the purpose of the current invention and still large enough for the Color Edge Detector (see previous description).

A separator may contain a combination of more colored and non-colored strips, which would result in more edges and, therefore, improved resolution.

The more colored strips and unique color edges in the pattern, the more enhanced the resolution and more accurate the resulting 3D model. The actual selection of the number of strips and their colors would preferably be made in accordance with the characteristics of the shape and colors of the object, whose 3D image is to be modeled.

To simplify the drawing and related description, a simpler pattern, which is based on only three basic colors, will be referred now (see FIG. 3b):

FIG. 3b shows another example of a unique colored pattern, which is much simpler than the colored pattern shown in FIG. 3a. The sequence of colored strips is:

bbwbwb
wbwRGwbwBG
wbwRBwbwGB
wbwBRwbwGRwbw
bwbwb

The sequence shown in FIG. 3b provides only six unique color combinations and a total of only 33 useful color edges (44 edges if left and right trailers are counted in addition to the unique color edges themselves). Left and right 'wbw' trailers are not counted nor they are recognized by the software, as they are included here only for geometrical reasons: only useful color edges will be eventually seen from all relevant calibration stops (see description relating to the calibration process).

Calibration Procedure and Relevant Calculation

Considering intrinsic inaccuracies in the components of 3D Scanner 10 (e.g., distorted lenses, inaccurate spatial position and orientations of the lenses, etc.), calibration of 3D Scanner 10 is essential prior to its usage.

In cases of robust (mechanically stable) implementation/assembly of a 3D Scanner 10, the 3D Scanner could be calibrated once at the manufacturing stage at the factory. Calibration can also be performed on the site where the scanner is being used if necessary. The calibration process is essentially the same for both cases.

The calibration process will be described with reference to FIGS. 4a to 6b and comprises two basic stages. The first stage involves utilization of a calibration grid, or calibration marks, the image of which is grabbed at different calibration stops. The first calibration stage is described in connection with FIGS. 4a, 4b, 5a and 5b. The second stage of the calibration process involves projection of a unique colored pattern on a white surface of; e.g., a planar board (being the calibration object). The second calibration stage is described in connection with FIGS. 6a and 6b.

The calibration process may be manual, nearly automated or fully automated. A manual calibration process will be now described by referring to FIG. 5a, and an automated calibration process will be described by referring to FIG. 5b.

The calibration process referred to as "Projection Light" technique is well known. Here it will be described specifically in connection with the goals of the present invention.

Figure 4A:
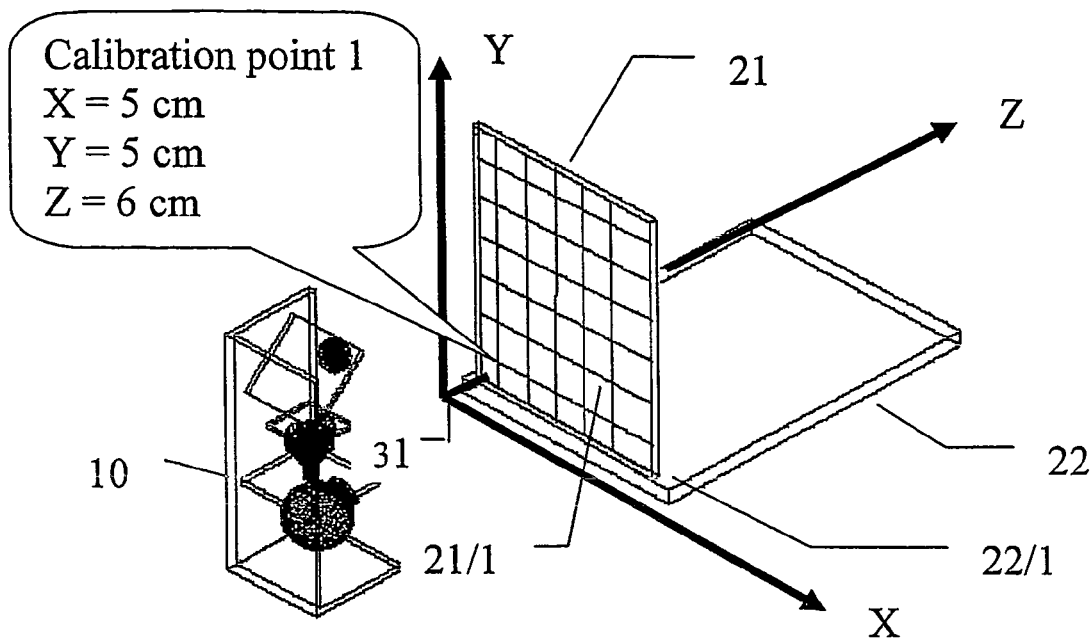
FIGS. 4a and 4b schematically illustrate positioning of a calibration object during the calibration process.
Figure 4B:
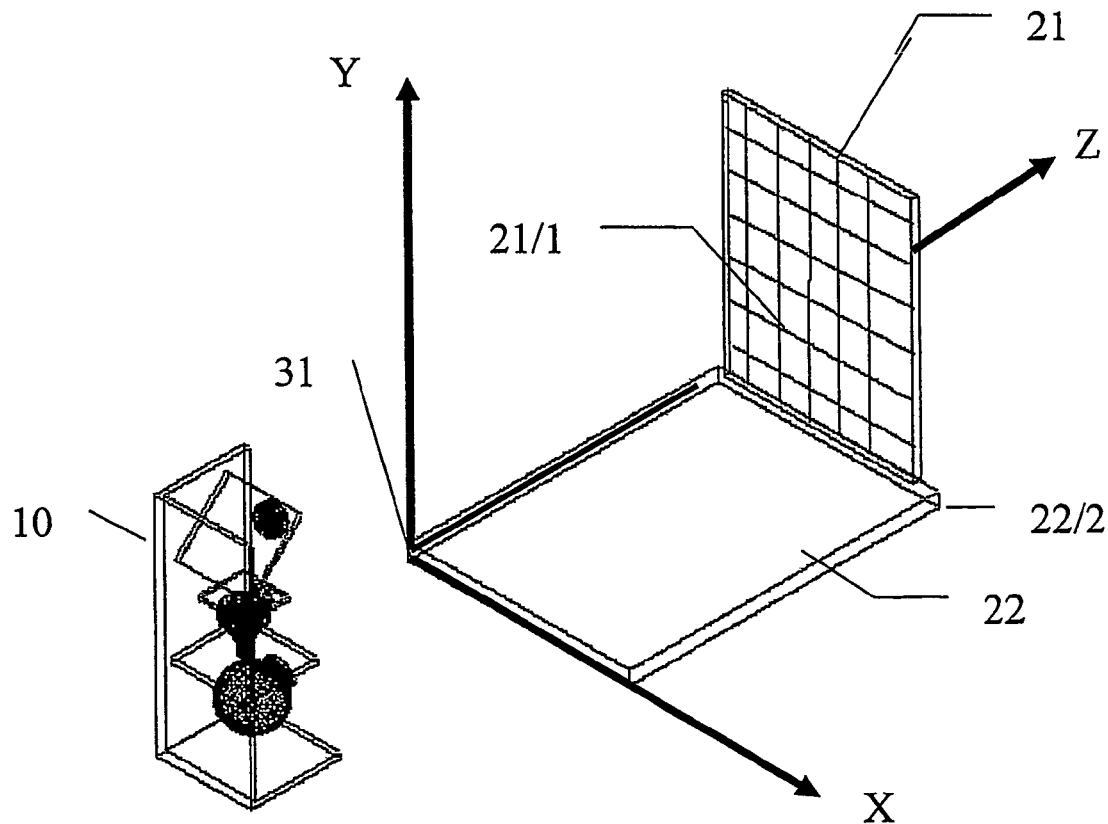

FIGS. 4a and 4b schematically illustrate the calibration system setup for the first stage of the calibration process. The calibration system comprises calibration object 21 and positioning means 22. According to one aspect of the present invention, the calibration object 21 is a flat plate, on one side of which there is printed, adhered, or etched, calibration grid 21/1, which is used in the first stage of the calibration process, for obtaining the first calibration data set. Calibration grid 21/1 includes parallel horizontal lines and parallel vertical lines that are equidistantly spaced from one another (e.g., by 1 cm). For simplicity only part of the horizontal and vertical lines are shown on FIG. 4a, 4b. Some crossing points, which are the crossings of some horizontal line with some vertical line, are referred to herein as calibration points. The other side (not shown) of calibration object 21 is white, for allowing projection of color pattern thereon while performing the second stage of the calibration process. The calibration grid could have different characteristics (i.e., color grid/pattern). The coordinates system is the following (see FIG. 4a): axis 'Z' points away from scanner 10; axis 'X' is the horizontal axis; 'Y' is the vertical axis and point {X=0, Y=0, Z=0} resides at point 31 on Positioning Means 22.

The calibration process includes utilization of both calibration grid 21/1 in the first stage of the calibration process and the side with the white surface in the second stage of the calibration process. The calibration process is carried out by placing scanner 10 at some distance from the calibration system, and moving calibration grid 21/1 to two or more calibration stops, for example, to a first calibration stop (i.e., the position nearest to scanner 10, location 22/1, where Z=0), and to a last calibration stop (i.e., the position furthest from scanner 10, location 22/2), while, at each calibration stop, scanner 10 grabs the image of calibration grid 21/1. Each one of the grabbed images of the calibration grid provides a set of calibration points, and the collection of sets of calibration points defines a 3D work space, in which an object could be later positioned in order to obtain its 3D model. The {X,Y,Z} coordinates of every calibration point in the 3D work space is known, and so is its corresponding {Row,Column} pair in the grabbed image. The relationships between the {X,Y,Z} coordinates of the calibration points to the corresponding {Row, Column} pairs for each calibration stop are referred to as the first calibration data set, which is stored in a storage array.

It should be noted, that, due to the principles disclosed herein, the absolute distance between scanner 10 and calibration grid 21/1 is unimportant for the calibration process, a fact that makes the calibration process very friendly to the user. The same is correct with respect to the exact orientation of calibration object 21 relative to the optical axis of scanner 10, because, after completing the calculations, an exact 3D shape will be obtained in any case.

Figure 5A:
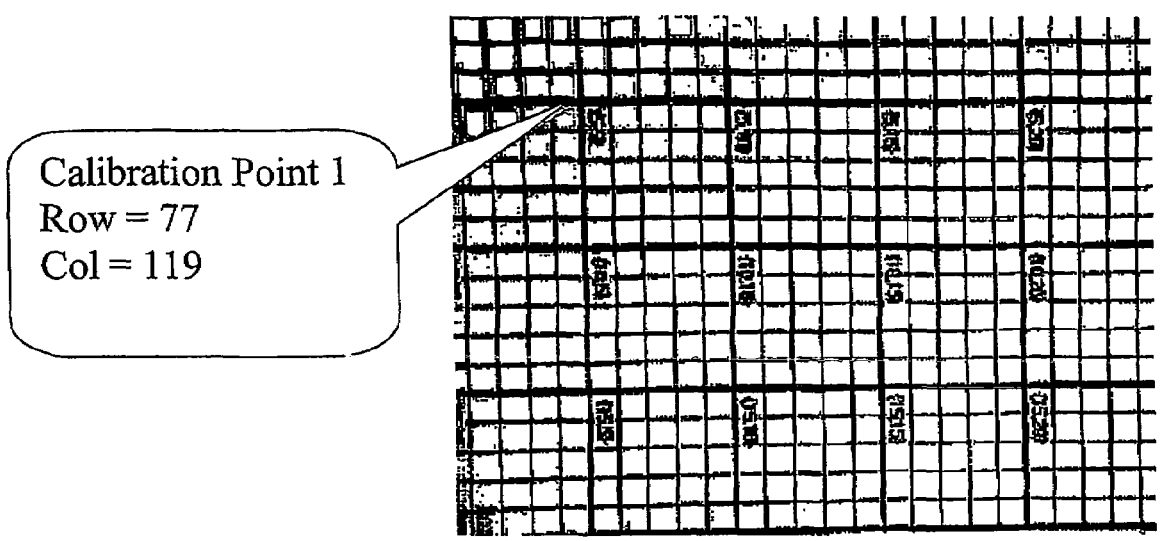
FIGS. 5a and 5b show utilization of exemplary calibration pattern that is utilized in manual or automatic calibration process, respectively, which is a first part of the calibration process.

FIG. 5a shows a realistic image of the real calibration grid with exemplary spacing 1 cm between horizontal and vertical lines, as captured, or grabbed, by scanner 10 (see FIG. 4a) while being positioned in the first calibration stop having exemplary value Z=6 cm.

Exemplary calibration point 1, the {X,Y,Z} coordinates of which (i.e., in cm) are {5,5,6} (see FIG. 4a), appears in the 2D representation as equivalent {Row,Column} pair {77, 119} (shown in FIG. 5a). It may be seen that optical distortion in this example is low (that is, vertical lines are nearly parallel and horizontal lines are nearly parallel, and angles between horizontal and vertical lines are nearly 90°.

In this case the mathematical relationship between {Row, Column} values of any point on this image and real {X,Y,Z} coordinates of this point may be approximated by simple linear interpolation equations:

$$X = A1 + B1*Row + C1*Col;$$

$$Y = A2 + B2*Row + C2*Col;$$

Wherein 'X' and 'Y' are absolute coordinates of some point on the Calibration Grid Pattern, and 'Row' and 'Col' are the row and column of the same point on the 2D image of the Calibration Grid Pattern. 'A1', 'B1', 'A2', 'B2', 'C1' and 'C2' are coefficients that are to be calculated during the calibration process. 'Z' is known and equals 6 cm.

In order to evaluate coefficients {A1, B1, C1} and {A2, B2, C2}, three calibration points are required: (Calibration Point 1 (an exemplary Point 1 is shown in FIGS. 4a and 5a), and additional Calibration Points 2 and 3 (not shown). The three Calibration points must not be positioned on the same straight line. Realistic coordinates of exemplary Point 2 and Point3 could be: {15,5,6} for Point 2, and {5,20,6} for Point 3.

This exemplary selection of calibration points creates a 2D 'working region' confined in the 2D rectangle defined by {X,Y} points {5,5} and {15,20}

The relationships between coordinates {X,Y,Z} and {Row, Column} pairs are found for two or more calibration stops, and stored as the first calibration data set.

In case the Linear mapping error appears to be significant, any appropriate nonlinear (for example bilinear) mapping may be used. In such a case more Calibration Points must be chosen.

In any case, the relationships between {Row,Column} for the first calibration stop will be later referenced as:

$X=F1(Row,Column)$ $Y=F2(Row,Column)$

And for the last calibration stop as:

$X=F3(Row,Column);$ $Y=F4(Row,Column);$

'Z' has a different known value for each calibration stop.

According to another aspect of the present invention, the calibration grid is replaced by calibration and control marks, as described in connection with FIG. 5b.

Figure 5B:
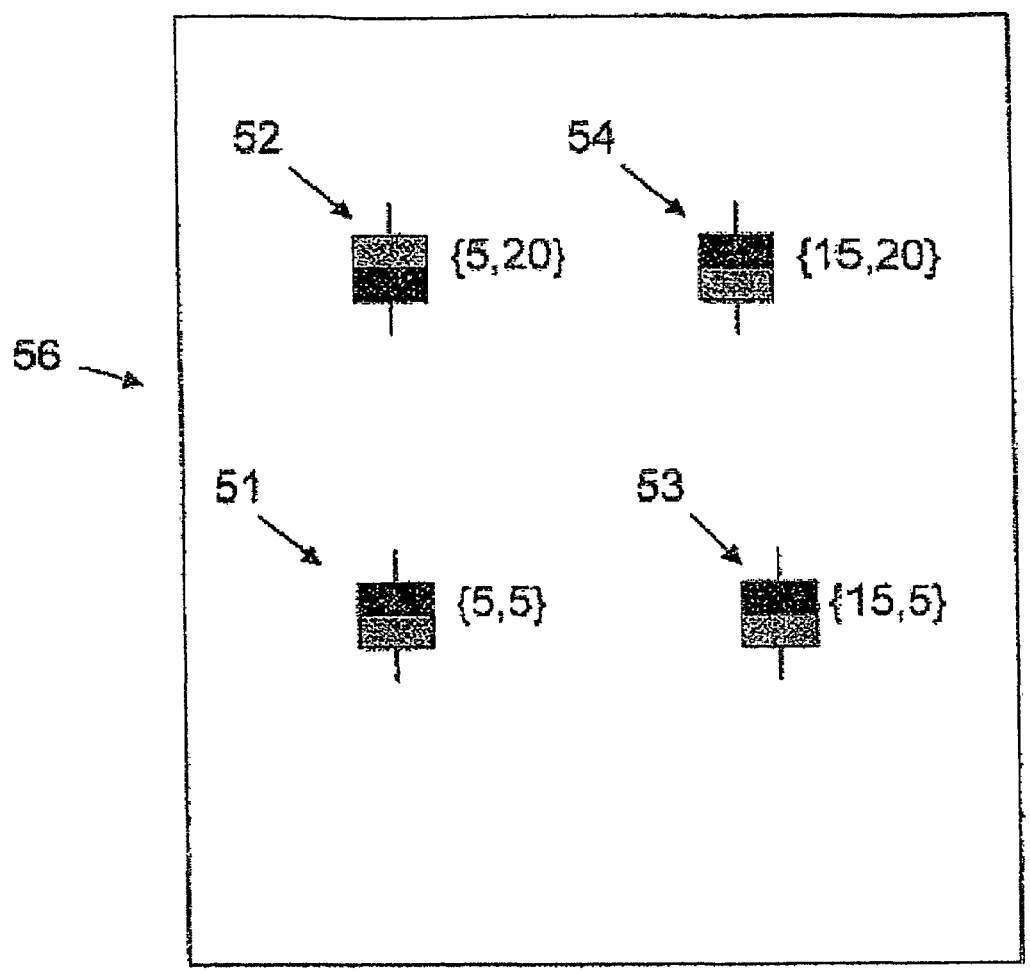
Figure 5B:
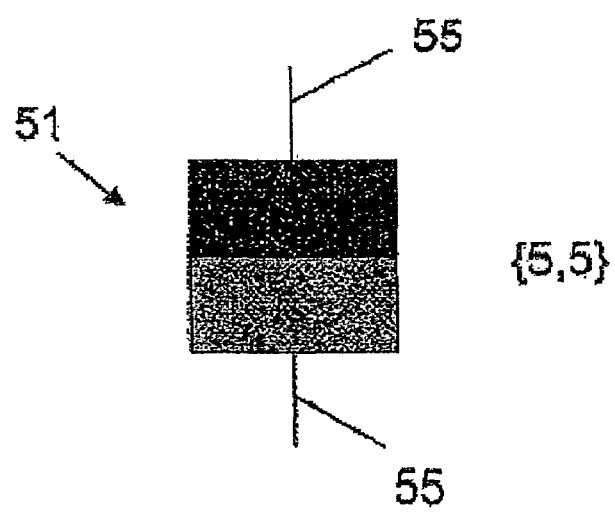

FIG. 5b shows an exemplary alternative for the calibration grid shown in FIG. 5a; that is, the calibration image of FIG. 5b could replace the calibration grid shown, for example, in FIG. 5a. Three special markers (i.e., 51, 52 and 53) are positioned at known calibration points, for example {5,5}, {5,20}, {15, 25}, respectively. An additional marker, a control marker, is positioned at {15,20}. Each marker comprises a pair of different color bars that create a unique color edge. By 'unique' it is meant (in this context) that each color edge appears only once in the calibration image 56. For example, for calibration marker 51 the bottom bar has a color Green and the upper bar has color Red (forming color edge 'G/R'), for marker 52 the corresponding colors are 'B/R', and for marker 53—'G/B'. Additional (control) marker 54 has 'Yellow—Black' color edge). Control mark 54 may be used for testing the accuracy of the automated calibration and accuracy of the interpolation relationships F1, F2.

Each unique color edge can be reliably found by a proper color edge detection algorithm. The central point of each color edge defines a calibration point. In contrast to utilizing a calibration grid such as the one shown, for example, in FIG. 5a, the {Row,Column} of the calibration points relating to FIG. 5b may be found automatically, by using corresponding software capable of, or designed for, performing DCED. Additionally, human readable marks could be added (i.e., {5,5},{15,5} etc. . . . ), to allow an operator to supervise and control the results of the automated calibration process.

During the automated calibration process, the calibration grid is to be positioned in two or more calibration stops, as is done in the manual calibration procedures described above. At each calibration stop the relationship between {X,Y,Z} coordinates and corresponding {Row,Column} of each calibration point is established. In cases where more calibration points are required, more markers might be utilized, each of which provides an additional unique color edge and corresponding calibration points.

Figure 6A:
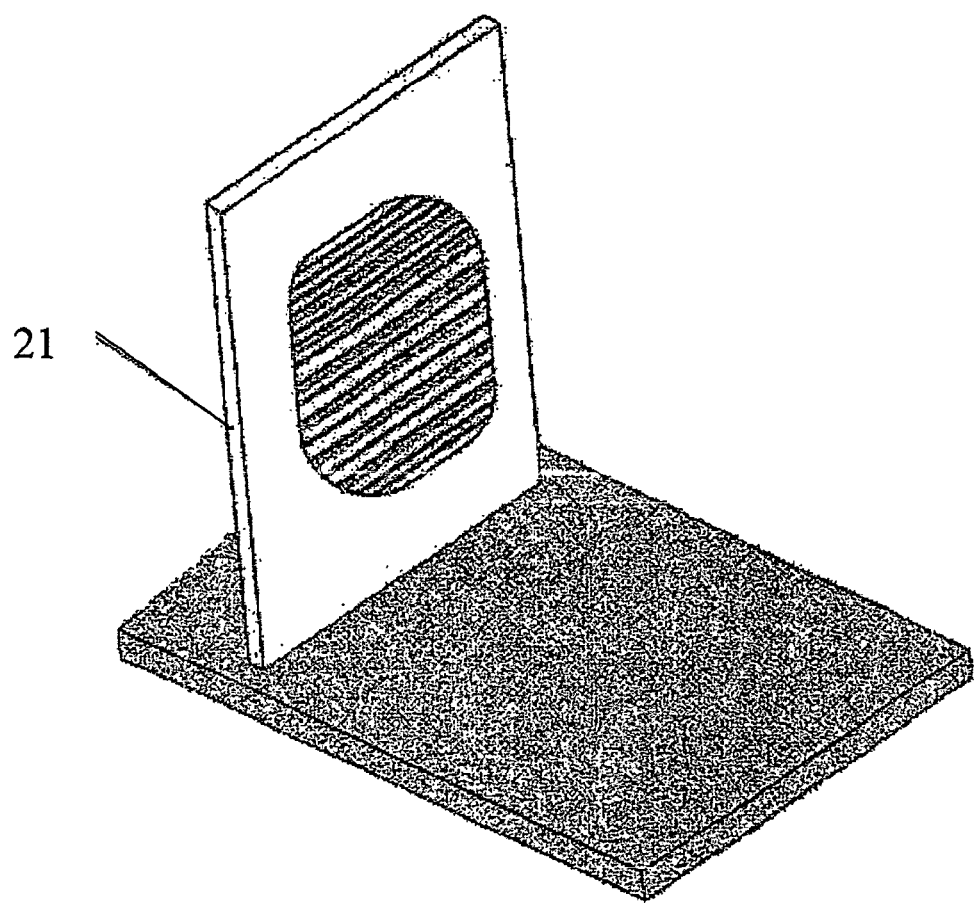
FIG. 6a shows utilization of exemplary unique color edge pattern as utilized in the second stage of the calibration process, according to a preferred embodiment of the present invention.
Figure 6B:
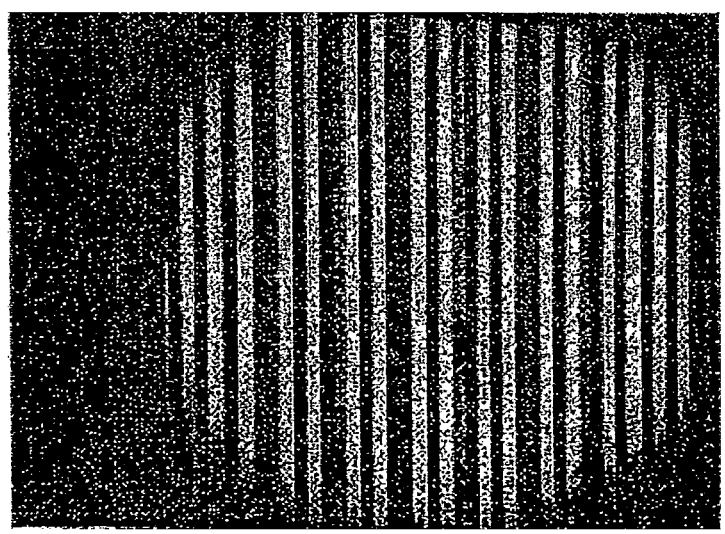
FIG. 6b shows grabbed image of exemplary unique color edge pattern as utilized in the second stage of the calibration process, according to a preferred embodiment of the present invention

FIG. 6a shows exemplary setup of a calibration system for the second stage of the calibration process. A color pattern, such as the color pattern shown in FIG. 3a or FIG. 3b, is projected by slide projector 17 onto a white surface of calibration object 21, and its image is grabbed by camera 12, as shown in FIG. 6b. Calibration object 21 is positioned at two or more calibration stops (each calibration stop having a different 'Z' coordinate), while at each calibration stop the corresponding image of the color pattern is grabbed. Accordingly, each unique color edge is acquired by camera 12 once for each of the actual calibration stops. For example, if there are only two calibration stops, each unique color edge will be grabbed twice, because each color is seen differently by camera 12 at the different calibration stops. The color edges in every grabbed image are then obtained by utilizing any of the readily available Directional Color Edge Detection techniques (DCED), and {Row,Column} pairs of points residing on the obtained color edges (e.g., G/R, G/B, etc.) are obtained. The obtained color edges, as they are seen by camera 12 from every calibration stop, are herein referred to as 'calibration color edges'. Next, each obtained point is assigned {X,Y,Z} coordinates by utilizing its {Row,Column} pair and the relationships between {Row,Column} pairs and {X,Y,Z} coordinates, as were obtained in the first calibration stage, when a calibration grid was utilized.

Figure 7A:
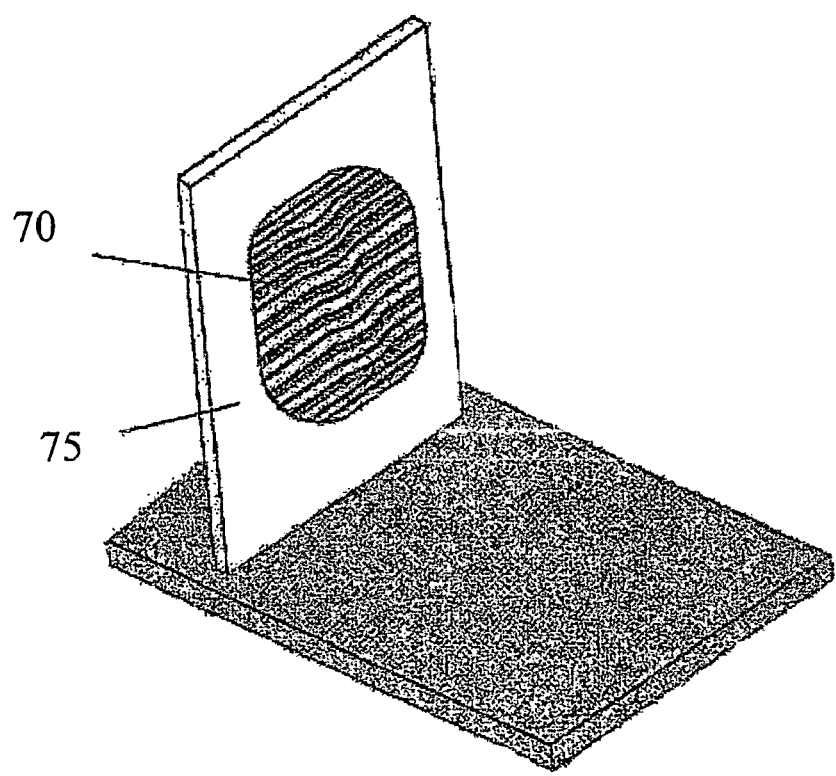
FIG. 7a shows an exemplary modeled plaster mimicking human face, while being illuminated by the color pattern shown in FIG. 6, where α≅0°, and positioned at some distance from an image grabbing apparatus.

FIG. 7a shows projection of a color pattern on an exemplary human face made of plaster, in accordance with the present invention. Object 70 (in this case a plaster object representing the front side of a head of a human) is placed in the work region in order to obtain its 3D model. A slide projector (not shown) projects a unique colored pattern, such as the color pattern shown in FIG. 3a or FIG. 3b, unto the face of object 70 (i.e., the color strips are shown as horizontal lines in FIG. 7a), and a camera/scanner (not shown) grabs the complex image that is reflected from object 70. By 'complex image' is meant an image that includes modified colored strips that are superimposed on the image of the face of the object, as shown in, e.g., FIG. 7b. The function of board 75 is only to provide mechanical support to plaster face 70 while the image of plaster face 70, with the color pattern projected there upon, is grabbed.

Figure 7B:
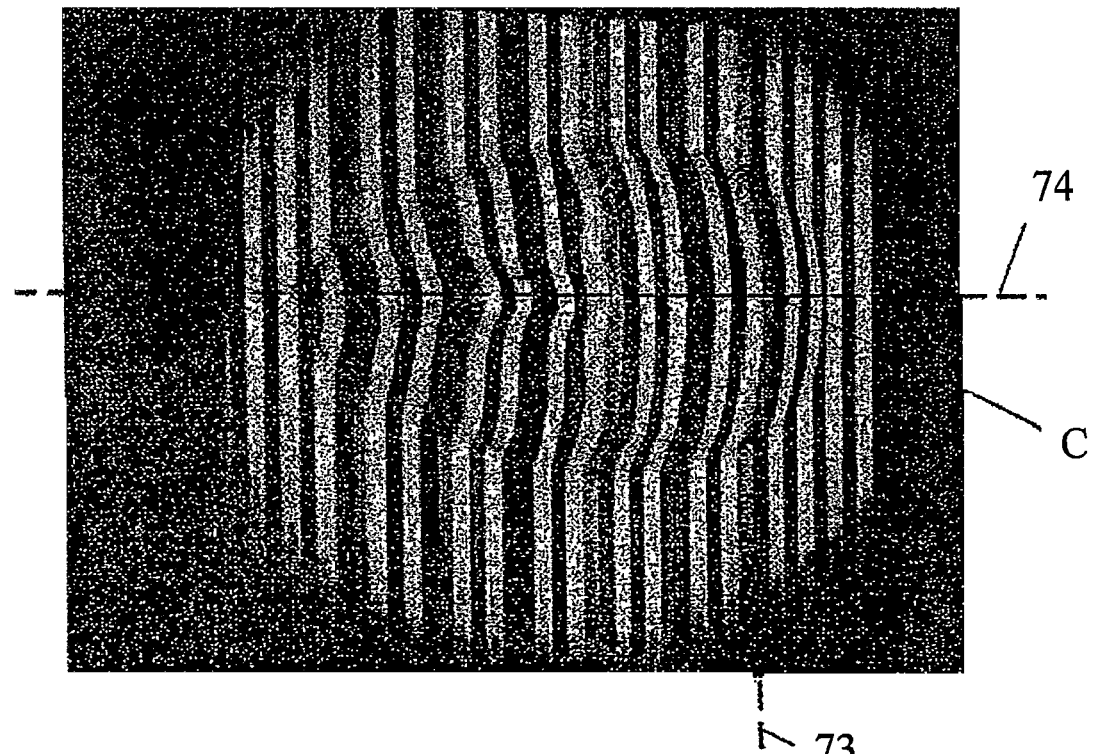

In FIG. 7b, reference numeral 73 denotes an exemplary color edge G/R, and reference numeral 74 denotes an exemplary Row line that is shifted, by a corresponding software, along color edge 73, for allowing obtaining points residing thereon and which will be later assigned corresponding {X,Y, Z} coordinates (by utilizing the first calibration data set) that will represent this color edge (i.e., G/R, 73). For example, at the current position of line 74, line 74 crosses color edge 73 at point C, the {Row, Column} pair of which is known to the software carrying the calculations.

Figure 7C:
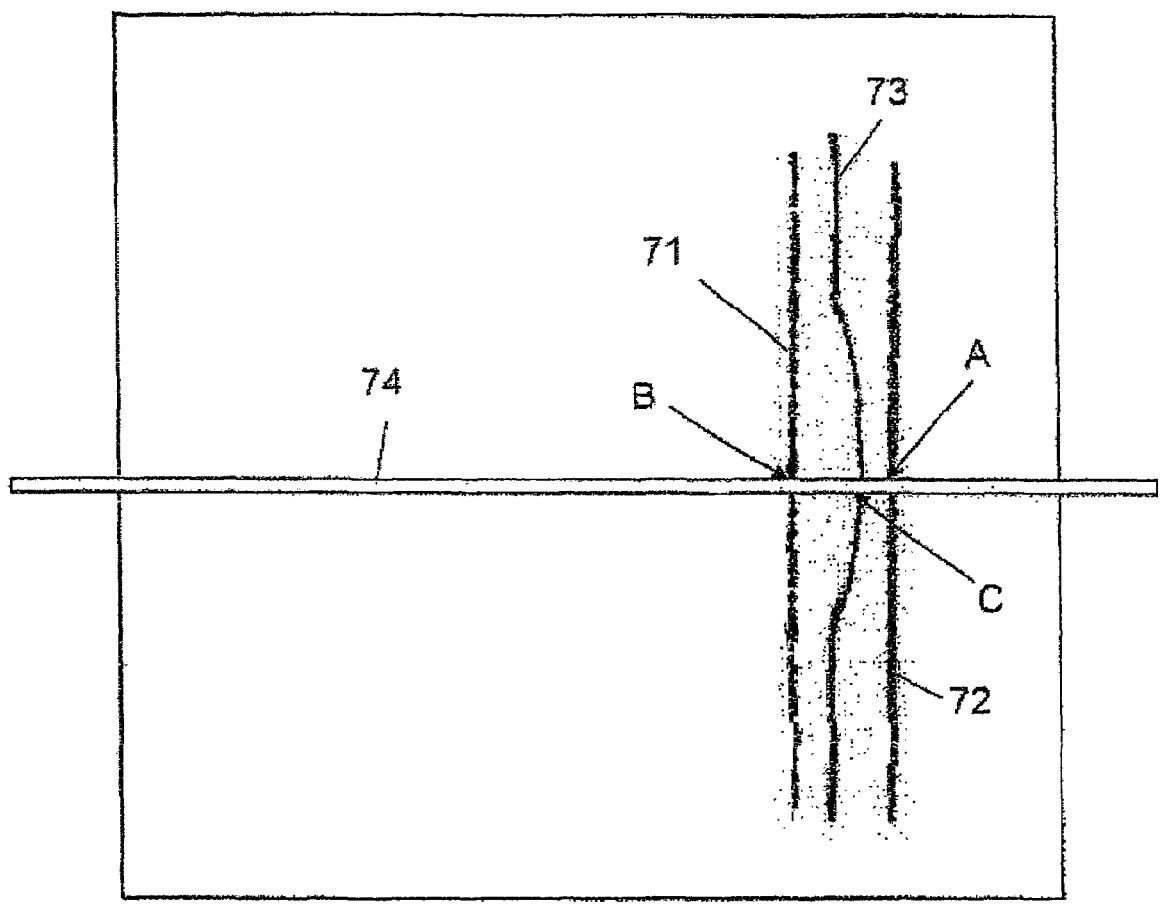
FIG. 7c illustrates relationship between exemplary two G/R calibration color edges and G/R color edge of the object whose 3D Model is to be obtained, according to the present invention.

FIG. 7c shows an exemplary detection of a G/R color edge by utilizing the G/R calibration color edges that were found in the second stage of the calibration process.

By 'G/R color edges' is meant, in this example, the same 'G/R' color edge that was seen by the camera from two different calibration stops. In FIG. 7c, reference numerals 71 and 72 denote the 'G/R' calibration color edges as seen by the camera/scanner from the first and last calibration stops, respectively. However, because it is most likely that real color edges would be at an arbitrary distance away from the camera (i.e., having arbitrary 'Z' coordinates), a real color edge would normally fall between two calibration color edges of the same type (e.g., G/R). Nevertheless, any such color edge is obtainable by utilizing the two (neighboring) calibration color edges that are the closest to specific real color edge (i.e., line 73). Represented by pixels, the {Row,Column} of points residing on the calibration color edges 71, 72, and on the real color edge 73, are known. In order to obtain a 3D model of the face of object 70 (FIG. 7a), there is a need to obtain the {X,Y,Z} coordinates that correspond to all of the {Row,Column} pairs of all of the real color edges.

In order to facilitate the understanding of how the latter requirement is fulfilled, the method of obtaining how {X,Y,Z} coordinates of real color edge 'G/R' 73 are obtained by utilizing the two calibration 'G/R' color edges that are the closest (i.e., 71 and 72) to 'G/R' color edge 73 it will now be described. Line 74 denotes the arbitrary Row (see also FIG. 7b) that was selected for demonstrating the calculations. In this example, Row=240. Point 'A' (in FIG. 7c) refers to the point on GR having Row value equals to 240 and column value equals to Col_F. The 'GR' in the first expression indicates that the calculation is related to the G/R color edge. The 'F' refers to the fact that the image of the color pattern was grabbed at the first calibration stop. Considering the fact that point {Row,Col_F} lies on a plane $Z=Z_F$, it is possible to map this point using the following equations:

$$X_A = F1(\text{Row},\text{Col\_}F);$$

$$Y_A = F2(\text{Row},\text{Col\_}F);$$

$$Z_A = Z_F;$$

Point 'B' (in FIG. 7c) refers to the point on GR having Row value equals to 240 and column value equals to Col_L. The 'L' in the latter expression refers to the fact that the image of the color pattern was grabbed at the last calibration stop. Considering the fact that point {Row,Col_L} lies on a plane $Z=Z_L$, it is possible to map this point using the following equations:

$$X_B = F3(\text{Row},\text{Col\_}L);$$

$$Y_B = F4(\text{Row},\text{Col\_}L);$$

$$Z_A = Z_L;$$

Relationships F1, F2, F3 and F4, are known at this stage, and their parameters (coefficients) are stored as the first calibration data set.

Computation Procedure

Point 'C' refers to a point of 'G/R' color edge lying on the object whose face is to be modeled. Point 'C' has Row and Column values {Row, Col_C}. Finding absolute {X, Y, Z} coordinates of point 'C' can be accomplished by, e.g., performing linear interpolation, as follows:

$$X = A_{11} + A_{12} * \text{Col};$$

$$Y = A_{21} + A_{22} * \text{Col}; \text{ and}$$

$Z = A_{31} + A_{32} * \text{Col}$; wherein the coefficients {A} are to be found as a solution of the following three interpolation pairs of linear equations:

$$X_A = A_{11} + A_{12} * \text{COl\_}F;$$

$$X_B = A_{11} + A_{12} * \text{Col\_}L; \text{ and}$$

$$Y_A = A_{21} + A_{22} * \text{COl\_}F;$$

$$Y_B = A_{21} + A_{22} * \text{Col\_}L; \text{ and}$$

$$Z_F = A_{31} + A_{32} * \text{Col\_}F;$$

$$Z_L = A_{31} + A_{32} * \text{Col\_}L;$$

Accordingly, the {X,Y,Z} coordinates of point 'C' are found using the coefficients {A}, as follows:

$$X_C = A_{11} + A_{12} * \text{Col\_C};$$

$$Y_C A_{21} + A_{22} \text{Col\_C};$$

$$Z_C = A_{31} + A_{32} * \text{Col\_C};$$

Coordinates {$X_C$, $Y_C$, $Z_C$} represent some point on the surface of the object whose 3D features are to be modeled, and the above described calculations are to be repeated for all of the Row values, such as Row 240, of the real 'G/R' color edge. After obtaining the 3D representation of the real 'G/R' color edge, the calculations are to be repeated for the other unique color edges, and, if required (such as when wishing to improve the resolution), for non-unique color edges.

In case color attribute is to be added, values {Row, Col_C} may be utilized for obtaining true color of a corresponding pixel of a 2D image of the object while illuminated by white light, and assigning the obtained true color to a corresponding point belonging to the 3D model.

Figure 8:
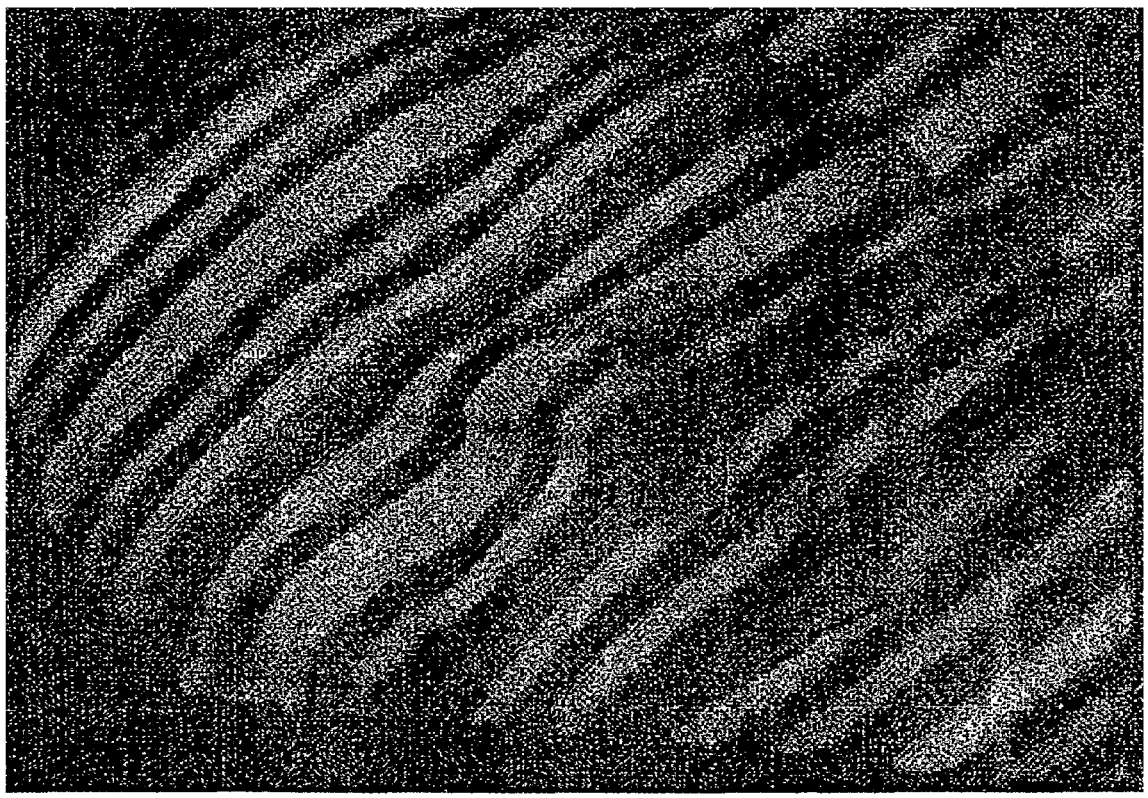
FIG. 8 shows a grabbed image of the plaster face illuminated by color pattern for which α≅45°.

FIG. 8 shows an exemplary complex image, according to an embodiment of the present invention. A unique colored pattern was projected onto a face of a plaster face mimicking a human's face (see, for example, FIG. 7b), and the complex image, which includes the color pattern superimposed on the plaster face, was grabbed by an image grabbing means, such as camera 12. The colored strips of the pattern shown in FIG. 8 are inclined by approximately $\alpha=45°$, with respect to the lines of the nose and mouth of the object, for allowing better accuracy to be obtained. Depending on the shape characteristics of an object, more than one color pattern could be utilized for enhancing accuracy of the resulting 3D model, each of each including strips that are inclined by a different angle. For example, a first color pattern could be utilized, for which $\alpha=0°$, like the color pattern shown in FIG. 7b, and a second color pattern could be utilized, for which $\alpha=45°$, like the color pattern shown in FIG. 8.

The result of the calculations is a set of 3D points that represent the shape of the object. This set could be utilized for modeling the object's shape, and the model could be utilized for manipulating corresponding 3D points to obtain essentially any desired representation of the object. For example, the model could be utilized to rotate the object from a first chosen position to a second chosen position. In addition, the model could be utilized to obtain an illusion of motion of the object, etc.

Described above calibration procedure and 3D coordinates calculation procedure are exemplary, so that any mathematically correct calibration procedure may be used and any other correct 3D coordinates calibration procedure may be used.

Specifically, in another embodiment of the current invention any other standard triangulation procedure or epipolar method may be used in order to obtain 3D points of the object lightened by structured light in the spirit of the current invention.

Additionally, described calibration method may be used with any other structured light patterns without departing from the spirit of the invention or exceeding the scope of the claims.

Specifically, described calibration method may be used without changes for single line pattern whereas light line is moved over the white surface of the calibration object by other means.

Additionally, described method of calculation of the 3D coordinates may be used with any other 3D scanner without departing from the spirit of the invention or exceeding the scope of the claims.

Specifically, described calibration method may be used without changes for single line pattern whereas light line is moved over the surface of the object by other means.

Other aspects of the invention described herein are set out in the following numbered clauses:—

1. A structured light pattern for use in the determination of 3D surface topology of a 3D structure, wherein said pattern may be projected onto such a structure and 3D surface topology thereof is determined from at least one image obtained of the structure with said pattern reflected therefrom, the pattern comprising a plurality of pairs of colored stripes, wherein each said pair comprises:
    two juxtaposed discrete stripes, one said stripe being of a different color from the other stripe; and
    a unique color edge defining a unique color transition boundary between the colors of said two adjacent stripes in a predetermined direction substantially orthogonal to a longitudinal direction of said stripes;
    wherein each said color edge is sufficiently unique at least one of:
       by itself; and
       in its spatial relationship with color edges of other said pairs of stripes in a common neighborhood in said pattern comprising said pairs;
    such as to enable identification of each color edge of said pattern when said pattern is reflected from said 3D structure.
2. The pattern according to numbered clause 1, wherein said unique color edge of each said pair is not repeated at least in adjacent said pairs thereto.
3. The pattern according to numbered clause 1, wherein said colors of said stripes in each pair are chosen to emphasize color contrast between one stripe and the other stripe of said pair.
4. The pattern according to numbered clause 1, wherein each said stripe comprises a color that is substantially uniform within the stripe.
5. The pattern according to numbered clause 1, wherein the pattern is based on said stripes being any one of three basic colors.
6. The pattern according to numbered clause 1, wherein said stripes are colored exclusively in primary colors chosen from the group: red, blue and green.
7. The pattern according to numbered clause 1, wherein said stripes are colored exclusively in colors chosen from the group: red, blue, green, magenta, cyan and yellow.
8. The pattern according to numbered clause 1, further comprising at least one spacer stripe between each adjacent said pair of stripes, said at least one spacer stripe being of a color having a predetermined color contrast with a said stripe of each one of said adjacent pairs of stripes that is adjacent to said at least one spacer stripe.
9. The pattern according to numbered clause 8, wherein said spacer stripes comprise a white stripe between adjacent pairs of stripes.
10. The pattern according to numbered clause 8, wherein said spacer stripes comprise a black stripe between adjacent pairs of stripes.
11. The pattern according to numbered clause 8, wherein said spacer stripes comprise a group of stripes, comprising a black stripe sandwiched between two white stripes, between adjacent pairs of stripes.
12. The pattern according to numbered clause 11, further comprising a trailer comprising at least one stripe adjacent to at least one or another of a first and a last said pairs taken along said direction.
13. The pattern according to numbered clause 12, wherein said trailer stripes comprise a group, comprising a sequence of two black stripes, a white stripe, a black stripe, a white stripe and a black stripe adjacent to said first pair of stripes.
14. The pattern according to numbered clause 13, wherein another said trailer stripes comprise a group, comprising a sequence of a black stripe, a white stripe, a black stripe, a white stripe and a black stripe adjacent to said last pair of stripes.
15. The pattern according to numbered clause 14, wherein said pattern comprises the following color stripe sequence:
    bbwbwb wbwRGwbwBG wbwRBwbwGB wbwBRwbwGRwbw bwbwb
    wherein:
    b=black stripe
    w=white stripe
    R=red stripe
    B=blue stripe
    G=green stripe
16. The pattern according to numbered clause 14, wherein said pattern comprises the following color stripe sequence:
    wbwRGwbwRBwbwRMwbwRCwbwRY
    wbwGRwbwGBwbwGMwbwGCwbwGY
    wbwBRwbwBGwbwBMwbwBCwbwBY
    wbwMRwbwMGwbwMBwbwMCwbwMY
    wbwCRwbwCGwbwCBwbwCMwbwCY
    wbwYRwbwYGwbwYBwbwYMwbwYCwbw
    wherein:
    b=black stripe
    w=white stripe
    R=red stripe
    B=blue stripe
    G=green stripe
    M=Magenta
    C=Cyan
    Y=Yellow.
17. Method for determining 3D surface topology of a 3D structure, comprising:—
    (a) illuminating said structure with the structured pattern defined in any one of numbered clauses 1 to 16;
    (b) capturing at least two images of the structure on which the said structured pattern is being shone;
    (c) identifying corresponding unique color edges between said images;
    (d) applying a suitable mathematical technique for determining surface coordinates of said structure from the correspondence found in step (c).
18. Method according to numbered clause 16, wherein in step (d), said mathematical technique includes a triangulation method.
19. Method according to numbered clause 16, wherein in step (d), said mathematical technique includes an epipolar method.
20. Method for determining surface topology of a 3D structure, comprising:—
    (i) providing a calibration image of a structured pattern, comprising a plurality of geometrical portions, reflected from a calibration object at each one of at least two calibration stops serially spaced along an optical axis at predetermined depths from a source projecting said structured pattern;
    (ii) for each said calibration image, identifying unique portions of said structured pattern corresponding to predetermined portions of said structured pattern in another said image, and determining spatial coordinates associated with said unique portions;
    (iii) aligning said structure along said optical axis, projecting said structured light pattern onto a surface of said structure wherein said pattern is modified by virtue of the topology of the structure surface such that to provide a modified pattern superposed over said structure surface comprising a plurality of modified geometrical portions corresponding to said geometrical portions;

(iv) providing at least one complex image of said structure surface with said modified pattern superposed thereon, and for each said complex image identifying unique modified geometrical portions corresponding to said geometrical portions; and (v) for each said unique modified portion, determining spatial coordinates associated therewith from the spatial coordinates obtained in (ii) for the corresponding unique portion of each said calibration image, to provide surface coordinates of said structure.

21. Method according to numbered clause 20, comprising:—

(a) providing a calibration image of a structured pattern reflected from a calibration object at each one of at least two calibration stops serially spaced along an optical axis at predetermined depths from a source projecting said structured pattern, said structured light pattern being defined in any one of numbered clauses 1 to 16;

(b) for each said calibration image, identifying unique color edges between stripes of each said pair of stripes and determining spatial coordinates associated with said unique color edges;

(c) aligning said structure along said optical axis, projecting said structured light pattern onto a surface of said structure wherein said pattern is modified by virtue of the topology of the structure surface such that to provide a modified pattern superposed over said structure surface comprising a plurality of modified color edges corresponding to said color edges;

(d) providing at least one complex image of said structure surface with said modified pattern superposed thereon, and for each said complex image identifying unique modified color edges between stripes of each said pair of stripes with respect to said color edges of said pattern; and (e) for each said unique modified color edge, determining spatial coordinates associated therewith from the spatial coordinates obtained in (b) for the corresponding unique color edge of each said calibration image, to provide surface coordinates of said structure.

22. Method according to numbered clause 21, wherein said structure surface has depth values from said source between a first depth and a second depth, and wherein one said calibration stop is at a depth from said source not greater than said first depth and another said calibration stop is at a depth from said source not less than said second depth, wherein said first depth is less than said second depth.

23. Method according to numbered clause 21, wherein steps (a) and (b) comprise the sub steps:

(i) Providing a storage array for storing a group of $\{X,Y,Z\}$ coordinates of a plurality of calibration points and a group of a plurality of $\{Row,Column\}$ pairs that represent said calibration points in said image grabbing apparatus; and also for storing the $\{X,Y,Z\}$ coordinates and the $\{Row,Column\}$ pairs that relate to the same calibration points;

(ii) Performing a first step of calibration, including:

(b.1) utilization of 2D calibration grid, for determining $\{X,Y,Z\}$ coordinates of a plurality of calibration points residing on the 2D calibration grid when placed at a predetermined calibration stop, and finding for each calibration point a corresponding $\{Row,Column\}$ pair that represents said calibration point in said image grabbing apparatus, the determined $\{X,Y,Z\}$ coordinates and the corresponding $\{Row,Column\}$ pairs, which represent the calibration points that reside on the same (X-Y) plane, being stored in said storage array;

(b.2) repeating step (b.1), with the 2D calibration grid placed at another one or more different calibration stops, in order to obtain calibration data that represent calibration points that reside on two or more different and parallel planes, said calibration points, which relate to every calibration stop, defining a work space and the calibration data relating to calibration points in said work space being a first calibration data set that is stored in said storage array;

(b.3) calculating, from the stored first calibration data set, a set of coefficients that represents the relationships, for each calibrating stop, between its $\{X,Y,Z\}$ coordinates in the 2D calibration grid and the $\{Row,Column\}$ pair that represents said calibration point in said image grabbing apparatus, said set of coefficients allowing obtaining the $\{X,Y,Z\}$ coordinates of essentially any point, given a $\{Row,Column\}$ pair representation of said point, by manipulating data that corresponds to calibration points that are, preferably, the closest to said point;

(iii) Placing a white planar surface at several calibration stops, as described in step (ii), while at each calibration stop performing:

c.1) Projecting a unique color pattern on said white planar surface that is located at two or more predetermined calibration stops;

c.2) Grabbing, by said image grabbing apparatus and for each calibration stop, a 2D image that is the reflection of the unique color pattern from said white planar surface;

c.3) Identifying, in the grabbed 2D image and for each calibration stop, points that represent unique calibration color edges that are contained in said unique color pattern, the identified points having corresponding $\{Row,Column\}$ pairs that are stored in the storage array, each unique calibration color edge being represented by two or more sets of $\{Row,Column\}$ pairs, each one of said sets of $\{Row,Column\}$ pairs being obtained for each calibration stop, and all of the sets of $\{Row,Column\}$ pairs being a second calibration data set that is stored in said storage array; and c.4) Using the coefficients found in step b.3) to translate the sets of $\{Row,Column\}$ pairs to corresponding $\{X,Y,Z\}$ coordinates.

24. Method according to numbered clause 23, wherein steps (c) to (e) comprise:

d.1) placing said object in said work space and projecting the unique color pattern on said object;

d.2) grabbing a 2D complex image that includes said color pattern, as deformed by said surface of the object, that is superimposed on said surface of said object;

d.3) identifying, in said complex image, $\{Row,Column\}$ pairs of points that represent the unique color edges that are included in the deformed color pattern; and d.4) Utilizing said coefficients for translating the $\{Row,Column\}$ pairs identified in step d.3) into corresponding $\{X,Y,Z\}$ coordinates, for obtaining 3D model of said surface of the object.

25. A system for the determination of 3D surface topology of a 3D structure, comprising:

illumination means adapted for projecting a beam of structured light onto at least said portion, said structured light having a pattern as defined in any one of numbered clauses 1 to 16;

at least one image capture means for capturing at least one image of said portion with said structured pattern projected thereon;

processing means adapted for determining surface topology of at least said portion based on said at least one image provided by said at least one image capture means.

26. System according to numbered clause 25, wherein said illumination means comprises a light source, focusing optics and a slide comprising said structured pattern.

27. System according to numbered clause 26, wherein said illumination means is comprised in a housing.

28. System according to numbered clause 27, wherein said housing further comprises said image capture means.

29. System according to numbered clause 27, wherein said image capture means comprises a digital image grabbing apparatus.

30. System according to numbered clause 25, further comprising a calibration apparatus, comprising a calibration object movable between at least a first calibration station and a second calibration station defining a workspace therebetween in which the said portion of said structure is to be positioned, wherein said processing means is adapted for determining depth values associated with said portion based on depth values of said calibration object at said at least first and second calibration stations.

31. System according to numbered clause 30, wherein said calibration object comprises a two-dimensional calibration grid including a plurality of parallel vertical lines and parallel horizontal lines that form an X-Y plane, the intersection points of said horizontal lines and said vertical lines are the calibration points.

32. System according to numbered clause 30, wherein said calibration object comprises a white surface on which a plurality of colored calibration markers are printed, painted, etched or adhered, each colored calibration marker comprising a pair of bars, each bar having different color for providing a unique color edge.

33. Method for generating a 3D model of a colored object, whose 2D image is grabbed by an image grabbing apparatus, comprising:

a) Providing a storage array for storing a group of {X,Y,Z} coordinates of a plurality of calibration points and a group of a plurality of {Row,Column} pairs that represent said calibration points in said image grabbing apparatus; and also for storing the {X,Y,Z} coordinates and the {Row,Column} pairs that relate to the same calibration points;

b) Performing a first step of calibration, including:

(b.1) utilization of 2D calibration grid, for determining {X,Y,Z} coordinates of a plurality of calibration points residing on the 2D calibration grid when placed at a predetermined calibration stop, and finding for each calibration point a corresponding {Row,Column} pair that represents said calibration point in said image grabbing apparatus, the determined {X,Y,Z} coordinates and the corresponding {Row,Column} pairs, which represent the calibration points that reside on the same (X-Y) plane, being stored in said storage array;

(b.2) repeating step (b.1), with the 2D calibration grid placed at another one or more different calibration stops, in order to obtain calibration data that represent calibration points that reside on two or more different and parallel planes, said calibration points, which relate to every calibration stop, defining a work space and the calibration data relating to calibration points in said work space being a first calibration data set that is stored in said storage array;

(b.3) calculating, from the stored first calibration data set, a set of coefficients that represents the relationships, for each calibrating stop, between its {X,Y,Z} coordinates in the 2D calibration grid and the {Row,Column} pair that represents said calibration point in said image grabbing apparatus, said set of coefficients allowing obtaining the {X,Y,Z} coordinates of essentially any point, given a {Row,Column} pair representation of said point, by manipulating data that corresponds to calibration points that are, preferably, the closest to said point;

The invention being characterized by performing a second step of calibration, which includes:

c) Placing a white planar surface at several calibration stops, as described in step b), while at each calibration stop performing:

c.1) Projecting a unique color pattern on said white planar surface that is located at two or more predetermined calibration stops, said unique color pattern being formed by a combination of a plurality of pairs of parallel color strips, each color strip having a different color with respect to the adjacent strip, for allowing identification of respective unique color edges, by employing Directional Color Edge Detection algorithm, said color strips could be inclined by an angle $\alpha$, with respect to contours and silhouettes lines on the surface of said object, said slide being intended to be projected on a white surface of a calibration object, for calibration purposes, and on said object whose 3D is to be obtained;

c.2) Projecting said unique color pattern on said white planar surface, and grabbing, by said image grabbing apparatus and for each calibration stop, a 2D image that is the reflection of the unique color pattern from said white planar surface;

c.3) Identifying, in the grabbed 2D image and for each calibration stop, points that represent unique calibration color edges that are contained in said unique color pattern, the identified points having corresponding {Row, Column} pairs that are stored in the storage array, each unique calibration color edge being represented by two or more sets of {Row,Column} pairs, each one of said sets of {Row,Column} pairs being obtained for each calibration stop, and all of the sets of {Row,Column} pairs being a second calibration data set that is stored in said storage array; and c.4) Using the coefficients found in step b.3) to translate the sets of {Row,Column} pairs to corresponding {X,Y,Z} coordinates.

d) Obtaining the 3D model of the surface of said object by:

d.1) placing said object in said work space and projecting the unique color pattern on said object;

d.2) grabbing a 2D complex image that includes said color pattern, as deformed by said surface of the object, that is superimposed on said surface of said object;

d.3) identifying, in said complex image, {Row,Column} pairs of points that represent the unique color edges that are included in the deformed color pattern; and d.4) Utilizing said coefficients for translating the {Row, Column} pairs identified in step d.3) into corresponding {X,Y,Z} coordinates, for obtaining 3D model of said surface of the object.

34. Method according to numbered clause 33, wherein the 2D calibration grid comprises a plurality of parallel vertical lines and parallel horizontal lines that form an X-Y plane, the intersection points of said horizontal lines and said vertical lines are the calibration points.

35. Method according to numbered clause 33, wherein the 2D calibration grid comprises a white surface of a 2D calibration object, on which a plurality of colored calibration markers are printed, painted, etched or adhered, each colored calibration marker comprising a pair of bars, each bar having different color for providing a unique color edge, the method for utilizing said calibration markers comprising: (a) grabbing, by an image grabbing apparatus, the image of the colored calibration markers; (b) identifying, in the grabbed image, the unique color edges; and (c) identifying the central point in each unique color edge, the identified central points are the calibration points.

36. Method according to numbered clause 33, wherein the unique colored pattern further includes separators, each separator being part of the color pattern and placed between two unique color edges for allowing to easily distinguish between the various unique color edges.

37. Method according to numbered clause 36, wherein a separator is placed at one or two extreme ends of the color pattern.

38. Method according to numbered clauses 36 or 37, wherein, the separator comprises a combination of white and black strips.

39. Method according to numbered clauses 36 or 37, wherein one or more of the separators, including those placed at the extreme ends of the unique color pattern, include any other combination(s) of colors.

40. Method according to numbered clause 33, wherein the method for obtaining the 3D coordinates of the surface of the 3D object further includes steps for imparting color attributes to the resulting representation of the modeled surface that essentially match the true colors of the surface of the object.

41. Method according to numbered clause 40, wherein the true color of the surface of the object is imparted to the 3D representation of the surface by performing:
   a) Grabbing a true color 2D image of the surface of the object while the surface of the object is illuminated by white light; and
   b) For each point belonging to the 3D model, assigning a true color to said point by identifying its {Row, Column} pair and by identifying the true color of a point in the true color 2D image, whose {Row, Column} pair is essentially identical to the {Row, Column} pair of the point belonging to the 3D model, the identified true color is assigned to the corresponding point belonging to the 3D model.

42. Method according to numbered clauses 36, 37 or 40, wherein the true color of the face of the object is imparted to the 3D representation by utilizing the white strips, which are part of the separators in the color pattern, to get true color information of points that are positioned on said stripes and represent the true color of matching points on the surface of the object.

43. Method according to numbered clause 33, wherein the object is a human being, and the surface of the object is, therefore, the face of the human being, or, optionally, any other part of interest.

44. Method according to numbered clause 33, wherein an angle $\alpha$ is utilized, said angle $\alpha$ being the angle between the color strips of the unique color pattern to contour or silhouette lines of the most conspicuous elements on the surface of the object, said angle $\alpha$ ensuring optimal identification of points residing on said contour/silhouette lines.

45. Method according to numbered clauses 33 or 44, wherein, depending on the shape/curvature characteristics of the surface of the object, two or more angles $\alpha$ are utilized for obtaining an optimal 3D model of said object, each $\alpha$ allows to establish different, and independent, set of data, each set of data allowing to optimized 3D model with respect to corresponding contour/silhouette lines.

46. Method according to numbered clause 33, wherein the resolution of the 3D model is enhanced by utilizing a colored pattern that comprises more unique color edges, and/or more separators.

47. Method according to numbered clause 33, wherein the resolution of the 3D Model is enhanced by utilizing the unique color pattern in two or more different positions.

48. Method according to numbered clause 47, wherein the color pattern is moved in the same plane in a direction that is not parallel to the colored strips of the color pattern, until brought to some desired positioning, or rotated about some preferred axis that is normal to the plane of the color pattern, until brought to some desired position, or both moved and rotated.

49. Apparatus for scanning an object for obtaining a 3D model of said object, comprising:
   a) A housing, comprising:
     a.1) A slide, containing a unique color edge pattern, said unique color edge pattern being formed by a combination of a plurality of pairs of parallel color strips, each color strip having a different color with respect to the adjacent strip, for allowing convenient and accurate identification of respective unique color edges, said color strips could be inclined by an angle $\alpha$, with respect to contours and silhouettes lines on the surface of said object, said slide being intended to be projected on a white surface of a calibration object, for calibration purposes, and on said object whose 3D is to be obtained;
     a.2) Slide projector lamp, for illuminating said slide that contains the unique color edge pattern;
     a.3) Slide projector condenser lens (optional), for providing parallel light to one side of said slide;
     a.4) Slide projector lens, for focusing the projected color edge pattern on said object;
     a.5) Mirror (optional), for deflecting the projected color edge pattern to the direction of the object; and
     a.6) Digital image grabbing apparatus, for grabbing a 2D image of calibration patterns and for grabbing an image of the reflection of the color edge pattern from the surface of the object.
   b) Calibration object, for obtaining a plurality of sets of calibration points, which define a work space and form a first and second calibration data sets, said calibration object being external to said housing and placed at various calibration stops with respect to the housing, for allowing obtaining said calibration points;
   c) Spot lamp (optional), for illuminating said calibration object, while the calibration process being carried out, and the surface of the object, in order to get true color 2D image of said object, for extracting true color information; and
   d) Computerized system, for:
     d.1) Receiving, from said digital image grabbing apparatus, 2D digital images of a calibration grid, or calibration marks with, optional, control marks at different calibration stops, at each calibration stop, a set of calibration points is obtained, the {X,Y,Z} coordinates of which are known;
     d.2) Relating the known {X,Y,Z} coordinates of each calibration point, in each set, to a corresponding {Row,Column} pair in the corresponding 2D digital image;
     d.3) Storing all of the relationships obtained in step d.2) as first calibration data set;
     d.4) performing steps d.1) and d.2), but with the calibration grid/marks being replaced by a color pattern, for obtaining relationships between {X,Y,Z} coordinates of points residing on each unique color edge that is included in the unique colored pattern;

d.5) Storing all of the relationships obtained in step d.4) as second calibration data set, and calculating there from a set of coefficients that represents the relationships for each calibrating stop between the {X,Y,Z} coordinates of each calibration point in the 2D calibration grid/marker and the {Row,Column} pair that represents the calibration point in the image grabbing apparatus, said set of coefficients allowing obtaining the {X,Y,Z} coordinates of essentially any point, given a {Row,Column} pair representation of this point, by manipulating data that corresponds to calibration points that are, preferably, the closest to this point;

d.6) Operating the slide, slide projector and, optionally, spot light, for projecting said color edge pattern on said object;

d.7) Receiving, from the digital image grabbing apparatus, 2D digital image(s) of the color edge pattern, as reflected by said object;

d.8) Identifying, in said 2D digital image, a set of points, the {Row,Column} pairs of which are known but the {X,Y,Z} coordinates of which are to be found, or calculated by interpolation/extrapolation; and d.9) Relating the known {Row,Column} pairs of said set of points to corresponding {X,Y,Z} coordinates by utilizing said set of coefficients, thereby obtaining a 3D model of said object; and d.10) imparting true color to said 3D model, by: (a) receiving a true color 2D image of the said object while said object is illuminated by white light; and (b) assigning, for each point belonging to the 3D model, a true color to said point by identifying its {Row, Column} pair and by identifying the true color of a point in said true color 2D image, whose {Row, Column} pair is essentially identical to the {Row, Column} pair of the point belonging to the 3D model, the identified true color is assigned to the corresponding point belonging to the 3D model.

50. Apparatus according to numbered clause 49, wherein the digital image grabbing apparatus does not reside within the housing.

51. A computer readable medium storing instructions for programming a microprocessor means of a system as defined in any one of numbered clauses 25 to 24 perform a method as defined in any one of numbered clauses 17 to 24.

In the method claims that follow, alphanumeric characters and Roman numerals used to designate claim steps are provided for convenience only and do not imply any particular order of performing the steps.

Finally, it should be noted that the word "comprising" as used throughout the appended claims is to be interpreted to mean "including but not limited to".

While some embodiments of the invention have been described by way of illustration, it will be apparent that the invention can be carried into practice with many modifications, variations and adaptations, and with the use of numerous equivalents or alternative solutions that are within the scope of persons skilled in the art, without departing from the spirit of the invention or exceeding the scope of the claims.

The invention claimed is:

1. A structured light pattern for use in the determination of 3D surface topology of a 3D structure wherein said pattern may be projected onto such a structure and 3D surface topology thereof is determined from at least one image obtained of the structure with said pattern reflected therefrom, the pattern comprising a plurality of pairs of colored stripes, wherein each said pair comprises:

two juxtaposed discrete stripes, one said stripe being of a different color from the other stripe; and a unique color edge defining a unique color transition boundary between the colors of said two adjacent stripes in a predetermined direction substantially orthogonal to a longitudinal direction of said stripes;

wherein each said color edge is sufficiently unique by itself within said pattern such as to enable identification of each color edge of said pattern when said pattern is reflected from said 3D structure further comprising at least one spacer stripe between each adjacent said pair of stripes, said at least one spacer stripe being of a color having a predetermined color contrast with a said stripe of each one of said adjacent pairs of stripes that is adjacent to said at least one spacer stripe wherein said spacer stripes comprise any one of:

a white stripe between adjacent pairs of stripes; or a black stripe between adjacent pairs of stripes; or a group of stripes, comprising a black stripe sandwiched between two white stripes, between adjacent pairs of stripes further comprising a trailer comprising at least one stripe adjacent to at least one or another of a first and a last said pairs taken along said direction wherein said trailer stripes comprise a group, comprising any one of a sequence of two black stripes, a white stripe, a black stripe, a white stripe and a black stripe adjacent to said first pair of stripes; or a sequence of a black stripe, a white stripe, a black stripe, a white stripe and a black stripe adjacent to said last pair of stripes.

2. The pattern according to claim 1, wherein said colors of said stripes in each pair are chosen to emphasize color contrast between one stripe and the other stripe of said pair.

3. The pattern according to claim 1, wherein each said stripe comprises a color that is substantially uniform within the stripe.

4. The pattern according to claim 1, wherein the pattern is based on said stripes being any one of three basic colors.

5. The pattern according to claim 1, wherein said stripes are colored exclusively in colors chosen from the group: red, blue, green, magenta, cyan and yellow.

6. A structured light pattern for use in the determination of 3D surface topology of a 3D structure, wherein said pattern may be projected onto such a structure and 3D surface topology thereof is determined from at least one image obtained of the structure with said pattern reflected therefrom, the pattern comprising a plurality of pairs of colored stripes, wherein each said pair comprises:

two juxtaposed discrete stripes, one said stripe being of a different color from the other stripe; and a unique color edge defining a unique color transition boundary between the colors of said two adjacent stripes in a predetermined direction substantially orthogonal to a longitudinal direction of said stripes;

wherein each said color edge is sufficiently unique by itself within said pattern such as to enable identification of each color edge of said pattern when said pattern is reflected from said 3D structure further comprising at least one spacer stripe between each adjacent said pair of stripes, said at least one spacer stripe being of a color having a predetermined color contrast with a said stripe of each one of said adjacent pairs of stripes that is adjacent to said at least one spacer stripe wherein said spacer stripes comprise any one of:

a white stripe between adjacent pairs of stripes; or a black stripe between adjacent pairs of stripes; or a group of stripes, comprising a black stripe sandwiched between two white stripes, between adjacent pairs of stripes further comprising a trailer comprising at least one stripe adjacent to at least one or another of a first and a last said pairs taken along said direction, wherein said pattern comprises the following color stripe sequence:

bbwbwb wbwRGwbwBG wbwRBwbwGB wbwBRwb-wGRwbw bwbwb wherein:

b=black stripe w=white stripe

R=red stripe

B=blue stripe

G=green stripe.

7. The pattern according to claim 6, wherein said colors of said stripes in each pair are chosen to emphasize color contrast between one stripe and the other stripe of said pair.

8. The pattern according to claim 6, wherein each said stripe comprises a color that is substantially uniform within the stripe.

9. The pattern according to claim 6, wherein the pattern is based on said stripes being any one of three basic colors.

10. The pattern according to claim 6, wherein said stripes are colored exclusively in colors chosen from the group: red, blue, green, magenta, cyan and yellow.

11. A structured light pattern for use in the determination of 3D surface topology of a 3D structure, wherein said pattern may be projected onto such a structure and 3D surface topology thereof is determined from at least one image obtained of the structure with said pattern reflected therefrom, the pattern comprising a plurality of pairs of colored stripes, wherein each said pair comprises:

two juxtaposed discrete stripes, one said stripe being of a different color from the other stripe; and a unique color edge defining a unique color transition boundary between the colors of said two adjacent stripes in a predetermined direction substantially orthogonal to a longitudinal direction of said stripes;

wherein each said color edge is sufficiently unique by itself within said pattern such as to enable identification of each color edge of said pattern when said pattern is reflected from said 3D structure further comprising at least one spacer stripe between each adjacent said pair of stripes, said at least one spacer stripe being of a color having a predetermined color contrast with a said stripe of each one of said adjacent pairs of stripes that is adjacent to said at least one spacer stripe wherein said spacer stripes comprise any one of:

a white stripe between adjacent pairs of stripes; or a black stripe between adjacent pairs of stripes; or a group of stripes, comprising a black stripe sandwiched between two white stripes, between adjacent pairs of stripes further comprising a trailer comprising at least one stripe adjacent to at least one or another of a first and a last said pairs taken along said direction wherein said pattern comprises the following color stripe sequence:

wbwRGwbwRBwbwRMwbwRCwbwRY
wbwGRwbwGBwbwGMwbwGCwbwGY
wbwBRwbwBGwbwBMwbwBCwbwBY
wbwMRwbwMGwbwMBwbwMCwbwMY
wbwCRwbwCGwbwCBwbwCMwbwCY
wbwYRwbwYGwbwYBwbwYMwbwYCwbw wherein:

b=black stripe w=white stripe

R=red stripe

B=blue stripe

G=green stripe

M=Magenta

C=Cyan

Y=Yellow.

12. The pattern according to claim 11, wherein said colors of said stripes in each pair are chosen to emphasize color contrast between one stripe and the other stripe of said pair.

13. The pattern according to claim 11, wherein each said stripe comprises a color that is substantially uniform within the stripe.

14. The pattern according to claim 11, wherein the pattern is based on said stripes being any one of three basic colors.

15. The pattern according to claim 11, wherein said stripes are colored exclusively in colors chosen from the group: red, blue, green, magenta, cyan and yellow.

16. Method for determining surface topology of a 3D structure, comprising:

a. providing a calibration image of a structured pattern, comprising a plurality of geometrical portions including a plurality of pairs of colored stripes, wherein each said pair comprises:

two juxtaposed discrete stripes, one said stripe being of a different color from the other stripe; and a unique color edge defining a unique color transition boundary between the colors of said two adjacent stripes in a predetermined direction substantially orthogonal to a longitudinal direction of said stripes;

wherein each said color edge is sufficiently unique by itself within said pattern such as to enable identification of each color edge of said pattern when said pattern is reflected from said 3D structure;

said calibration image being reflected from a calibration object at each one of at least two calibration stops serially spaced along an optical axis at predetermined depths from a source projecting said structured pattern;

(ii) for each said calibration image, identifying unique portions of said structured pattern corresponding to predetermined portions of said structured pattern in another said image, and determining spatial coordinates associated with said unique portions;

(iii) aligning said structure along said optical axis, projecting said structured light pattern onto a surface of said structure wherein said pattern is modified by virtue of the topology of the structure surface such that to provide a modified pattern superposed over said structure surface comprising a plurality of modified geometrical portions corresponding to said geometrical portions;

(iv) providing at least one complex image of said structure surface with said modified pattern superposed thereon, and for each said complex image identifying unique modified geometrical portions corresponding to said geometrical portions; and (v) for each said unique modified portion, determining spatial coordinates associated therewith from the spatial coordinates obtained in (ii) for the corresponding unique portion of each said calibration image, to provide surface coordinates of said structure.

17. Method according to claim 16, comprising:
(a) providing a calibration image of a structured pattern reflected from a calibration object at each one of at least two calibration stops serially spaced along an optical axis at predetermined depths from a source projecting said structured pattern, said structured light pattern comprising a plurality of pairs of colored stripes, wherein each said pair comprises:
two juxtaposed discrete stripes, one said stripe being of a different color from the other stripe; and
a unique color edge defining a unique color transition boundary between the colors of said two adjacent stripes in a predetermined direction substantially orthogonal to a longitudinal direction of said stripes;
wherein each said color edge is sufficiently unique by itself such as to enable identification of each color edge of said pattern when said pattern is reflected from said 3D structure;
(b) for each said calibration image, identifying unique color edges between stripes of each said pair of stripes and determining spatial coordinates associated with said unique color edges;
(c) aligning said structure along said optical axis, projecting said structured light pattern onto a surface of said structure wherein said pattern is modified by virtue of the topology of the structure surface such that to provide a modified pattern superposed over said structure surface comprising a plurality of modified color edges corresponding to said color edges;
(d) providing at least one complex image of said structure surface with said modified pattern superposed thereon, and for each said complex image identifying unique modified color edges between stripes of each said pair of stripes with respect to said color edges of said pattern; and
(e) for each said unique modified color edge, determining spatial coordinates associated therewith from the spatial coordinates obtained in (b) for the corresponding unique color edge of each said calibration image, to provide surface coordinates of said structure.

18. Method according to claim 17, wherein said structure surface has depth values from said source between a first depth and a second depth, and wherein one said calibration stop is at a depth from said source not greater than said first depth and another said calibration stop is at a depth from said source not less than said second depth, wherein said first depth is less than said second depth.

19. Method according to claim 17, wherein steps (a) and (b) comprise the sub steps:
(i) Providing a storage array for storing a group of {X,Y,Z} coordinates of a plurality of calibration points and a group of a plurality of {Row,Column} pairs that represent said calibration points in said image grabbing apparatus; and also for storing the {X,Y,Z} coordinates and the {Row,Column} pairs that relate to the same calibration points;
(ii) Performing a first step of calibration, including:
(b.1) utilization of 2D calibration grid, for determining {X,Y,Z} coordinates of a plurality of calibration points residing on the 2D calibration grid when placed at a predetermined calibration stop, and finding for each calibration point a corresponding {Row,Column} pair that represents said calibration point in said image grabbing apparatus, the determined {X,Y,Z} coordinates and the corresponding {Row,Column} pairs, which represent the calibration points that reside on the same (X-Y) plane, being stored in said storage array;
(b.2) repeating step (b.1), with the 2D calibration grid placed at another one or more different calibration stops, in order to obtain calibration data that represent calibration points that reside on two or more different and parallel planes, said calibration points, which relate to every calibration stop, defining a work space and the calibration data relating to calibration points in said work space being a first calibration data set that is stored in said storage array;
(b.3) calculating, from the stored first calibration data set, a set of coefficients that represents the relationships, for each calibrating stop, between its {X,Y,Z} coordinates in the 2D calibration grid and the {Row,Column} pair that represents said calibration point in said image grabbing apparatus, said set of coefficients allowing obtaining the {X,Y,Z} coordinates of essentially any point, given a {Row,Column} pair representation of said point, by manipulating data that corresponds to calibration points that are, preferably, the closest to said point;
(iii) Placing a white planar surface at several calibration stops, as described in step (ii), while at each calibration stop performing:
c.1) Projecting a unique color pattern on said white planar surface that is located at two or more predetermined calibration stops;
c.2) Grabbing, by said image grabbing apparatus and for each calibration stop, a 2D image that is the reflection of the unique color pattern from said white planar surface;
c.3) Identifying, in the grabbed 2D image and for each calibration stop, points that represent unique calibration color edges that are contained in said unique color pattern, the identified points having corresponding {Row,Column} pairs that are stored in the storage array, each unique calibration color edge being represented by two or more sets of {Row,Column} pairs, each one of said sets of {Row,Column} pairs being obtained for each calibration stop, and all of the sets of {Row,Column} pairs being a second calibration data set that is stored in said storage array; and
c.4) Using the coefficients found in step b.3) to translate the sets of {Row,Column} pairs to corresponding {X,Y,Z} coordinates.

20. Method according to claim 19, wherein steps (c) to (e) comprise:
d.1) placing said object in said work space and projecting the unique color pattern on said object;
d.2) grabbing a 2D complex image that includes said color pattern, as deformed by said surface of the object, that is superimposed on said surface of said object;
d.3) identifying, in said complex image, {Row,Column} pairs of points that represent the unique color edges that are included in the deformed color pattern; and
d.4) Utilizing said coefficients for translating the {Row,Column} pairs identified in step
d.3) into corresponding {X,Y,Z} coordinates, for obtaining 3D model of said surface of the object.

21. A computer readable medium storing instructions for programming a microprocessor means of a system adapted for determining 3D surface topology of a 3D structure to perform a method as defined in claim 16.

* * * * *